United States Patent
Wang et al.

(10) Patent No.: US 9,894,003 B2
(45) Date of Patent: Feb. 13, 2018

(54) METHOD, APPARATUS AND SYSTEM FOR PROCESSING DATA PACKET

(71) Applicant: HUAWEI TECHNOLOGIES CO., LTD., Shenzhen, Guangdong (CN)

(72) Inventors: Yan Wang, Shenzhen (CN); Weihua Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 237 days.

(21) Appl. No.: 14/611,470

(22) Filed: Feb. 2, 2015

(65) Prior Publication Data

US 2015/0146718 A1 May 28, 2015

Related U.S. Application Data

(63) Continuation of application No. PCT/CN2012/079602, filed on Aug. 2, 2012.

(51) Int. Cl.
*H04L 12/851* (2013.01)
*H04L 12/721* (2013.01)
*H04L 12/781* (2013.01)

(52) U.S. Cl.
CPC .......... *H04L 47/2483* (2013.01); *H04L 45/38* (2013.01); *H04L 45/52* (2013.01); *H04L 45/70* (2013.01)

(58) Field of Classification Search
CPC ... H04L 47/825; H04L 47/2483; H04L 45/38; H04L 45/52; H04L 45/70
See application file for complete search history.

(56) References Cited

U.S. PATENT DOCUMENTS

2011/0261825 A1 10/2011 Ichino
2013/0054761 A1* 2/2013 Kempf ................ H04L 12/4633
709/220

(Continued)

FOREIGN PATENT DOCUMENTS

CN 101594355 A 12/2009
CN 102333039 A 1/2012

(Continued)

OTHER PUBLICATIONS

"OpenFlow Switch Specification," Version 1.3.0, Wire Protocol 0x04, pp. 1-105, Open Network Foundation, Palo Alto, California (Jun. 25, 2012).

(Continued)

*Primary Examiner* — Paul H Masur
(74) *Attorney, Agent, or Firm* — Leydig, Voit & Mayer, Ltd.

(57) ABSTRACT

The disclosure provides a method, apparatus and system. The method includes: matching a data packet with match field information of a flow entry, the flow entry including the match field information and operation field information; wherein the operation field information includes an operation type and first bit field indication information which includes a first offset and a first field length and is used for indicating the first bit field of the data packet, or the match field information includes second bit field indication information and a match value, the second bit field indication information includes a second offset and a second field length, and the second bit field indication information is used for indicating the second bit field of the data packet; performing, if the data packet is successfully matched with the match field information, an operation on the data packet according to the operation field information.

17 Claims, 8 Drawing Sheets

(56) References Cited

U.S. PATENT DOCUMENTS

2015/0023176 A1* 1/2015 Korja ............... H04L 45/42
370/236
2015/0052234 A1* 2/2015 Hahn ............... H04L 61/6013
709/223

FOREIGN PATENT DOCUMENTS

CN 102349268 A 2/2012
CN 102594689 A 7/2012

OTHER PUBLICATIONS

Denicol et al.,"On IPv6 support in OpenFlow via Flexible Match Structures," Change & Ofelia Summer school, XP55293984A, Berlin, Germany (Nov. 2011).

* cited by examiner

METHOD, APPARATUS AND SYSTEM FOR PROCESSING DATA PACKET

CROSS-REFERENCE TO RELATED APPLICATIONS

This application is a continuation of International Application No. PCT/CN2012/079602, filed on Aug. 2, 2012 which is hereby incorporated by reference in its entirety.

FIELD

The present disclosure relates to the technical field of information, and particularly, to a method, apparatus and system for processing a data packet.

BACKGROUND

An OpenFlow technology aims at solving the bottlenecks of a current network in the face of new services by use of innovative internetworking concepts based on the existing TCP/IP technical conditions. The core idea thereof is to convert the original data packet forwarding process completely controlled by a switch/router into independent processes, which are respectively completed by an OpenFlow switch and an Openflow controller. Thus, distributed deployment and centralized management can be achieved on devices in an OpenFlow network, to change the network into a user-definable form.

Although in the OpenFlow network, a user may decide how to route a data packet or how to control access and the like, operation on a data packet is still limited to the existing specific protocol format, so that the user may only perform custom operation with reference to a regulated protocol format. Protocol formats supportable in the current OpenFlow specification are limited, resulting in limited application scenarios. To satisfy a newly added protocol requirement, the OpenFlow specification needs to be further extended as for the specific newly added protocol, which will result in complicated extensions.

SUMMARY

The embodiments of the present disclosure provide a method, apparatus and system for processing a data packet, which can achieve flexible custom processing of the data packet.

In a first aspect, a method for processing a data packet is provided, including: matching a data packet with match field information of a flow entry, the flow entry comprising the match field information and operation field information; wherein the operation field information comprises an operation type and first bit field indication information, the first bit field indication information comprises a first offset and a first field length, and the first bit field indication information is used for indicating a first bit field of the data packet, or the match field information comprises second bit field indication information and a match value, the second bit field indication information comprises a second offset and a second field length, and the second bit field indication information is used for indicating a second bit field of the data packet; and performing, if the data packet is successfully matched with the match field information, an operation on the data packet according to the operation field information.

In a first possible implementation of the first aspect, when the operation field information includes the operation type and the first bit field indication information, the performing the operation on the data packet according to the operation field information, comprises: determining the first bit field of the data packet according to the first bit field indication information; and performing the operation on the first bit field according to the operation type.

In combination with the first aspect or the first possible implementation of the first aspect, in a second possible implementation, when the match field information includes the second bit field indication information and the match value, the matching the data packet with the match field information of the flow entry comprises: determining the second bit field of the data packet according to the second bit field indication information; and matching the second bit field according to the match value.

In a second aspect, an apparatus for processing a data packet is provided, including: a matching unit, configured to match a data packet with match field information of a flow entry; the flow entry including the match field information and operation field information; wherein the operation field information includes an operation type and first bit field indication information, the first bit field indication information includes a first offset and a first field length, and the first bit field indication information is used for indicating the first bit field of the data packet, or the match field information includes second bit field indication information and a match value, the second bit field indication information includes a second offset and a second field length, and the second bit field indication information is used for indicating the second bit field of the data packet; and an operating unit, configured to perform, if the data packet is successfully matched with the match field information, an operation on the data packet according to the operation field information.

In a first possible implementation of the second aspect, when the operation field information includes the operation type and the first bit field indication information, the operating unit is specifically configured to, if the data packet is successfully matched with the match field information, determine the first bit field of the data packet according to the first bit field indication information, and perform the operation on the first bit field according to the operation type.

In combination with the second aspect or the first possible implementation of the second aspect, in a second possible implementation of the second aspect, when the match field information includes the second bit field indication information and the match value, the matching unit is specifically configured to determine the second bit field of the data packet according to the second bit field indication information; and match the second bit field according to the match value.

In a third aspect, a method for processing a data packet is provided, including: generating a flow entry addition indication message, the flow entry addition indication message comprising match field information and operation field information; wherein the operation field information comprises an operation type and first bit field indication information, the first bit field indication information comprises a first offset and a first field length, and the first bit field indication information is used for indicating a first bit field of the data packet, or the match field information comprises second bit field indication information and a match value, the second bit field indication information comprises a second offset and a second field length, and the second bit field indication information is used for indicating a second bit field of the data packet; and sending the flow entry addition indication message to a switching device, for enabling the switching device to generate a flow entry according to the flow entry addition indication message and process the data packet according to the flow entry.

In a first possible implementation of the third aspect, the method further includes: sending a feature request message to the switching device, wherein the feature request message is used for inquiring whether the match field information or the operation field information is supported; and receiving a feature response message sent by the switching device, wherein the feature response message is used for indicating that the match field information or the operation field information is supported.

In a fourth aspect, an apparatus for processing a data packet is provided, including: a generating unit configured to generate a flow entry addition indication message, and the flow entry addition indication message includes match field information and operation field information; wherein the operation field information includes an operation type and first bit field indication information, the first bit field indication information includes a first offset and a first field length, the first bit field indication information is used for indicating a first bit field of the data packet, or the match field information includes second bit field indication information and a match value, the second bit field indication information includes a second offset and a second field length, and the second bit field indication information is used for indicating a second bit field of the data packet; and a sending unit, configured to send the flow entry addition indication message to a switching device, for enabling the switching device to generate a flow entry according to the flow entry addition indication message and process the data packet according to the flow entry.

In a first possible implementation of the fourth aspect, the sending unit is further configured to send a feature request message to the switching device, wherein the feature request message is used for inquiring whether the match field information or the operation field information is supported; and the apparatus further includes a receiving unit, configured to receive a feature response message sent by the switching device, wherein the feature response message is used for indicating that the match field information or the operation field information is supported.

In a fifth aspect, a system for processing a data packet is provided, including the apparatus for processing a data packet provided in the second aspect and the apparatus for processing a data packet provided in the fourth aspect.

In the above-mentioned solutions, since a particular bit field of the data packet may be flexibly determined according to the offset and the field length and the particular bit field is matched or operated, flexible custom processing of the data packet may be achieved, such that the processing of the data packet is not limited to a particular protocol format any more, standardized extension of a newly added protocol is avoided, and the processing of the data packet is more universal.

BRIEF DESCRIPTION OF THE DRAWINGS

To illustrate technical solutions in the embodiments of the present disclosure more clearly, a brief introduction on the accompanying drawings which are needed in the description of the embodiments is given below. Apparently, the accompanying drawings in the description below are merely some of the embodiments of the present disclosure, based on which other drawings may be acquired by those of ordinary skill in the art without any creative effort.

DETAILED DESCRIPTION OF THE EMBODIMENTS

A clear and complete description of technical solutions in the embodiments of the present disclosure will be given below, in combination with the accompanying drawings in the embodiments of the present disclosure. Apparently, the embodiments described are merely a part, but not all, of the embodiments of the present disclosure. All of other embodiments, acquired by those of ordinary skill in the art based on the embodiments of the present disclosure without any creative effort, fall into the protection scope of the present disclosure.

Figure 1:
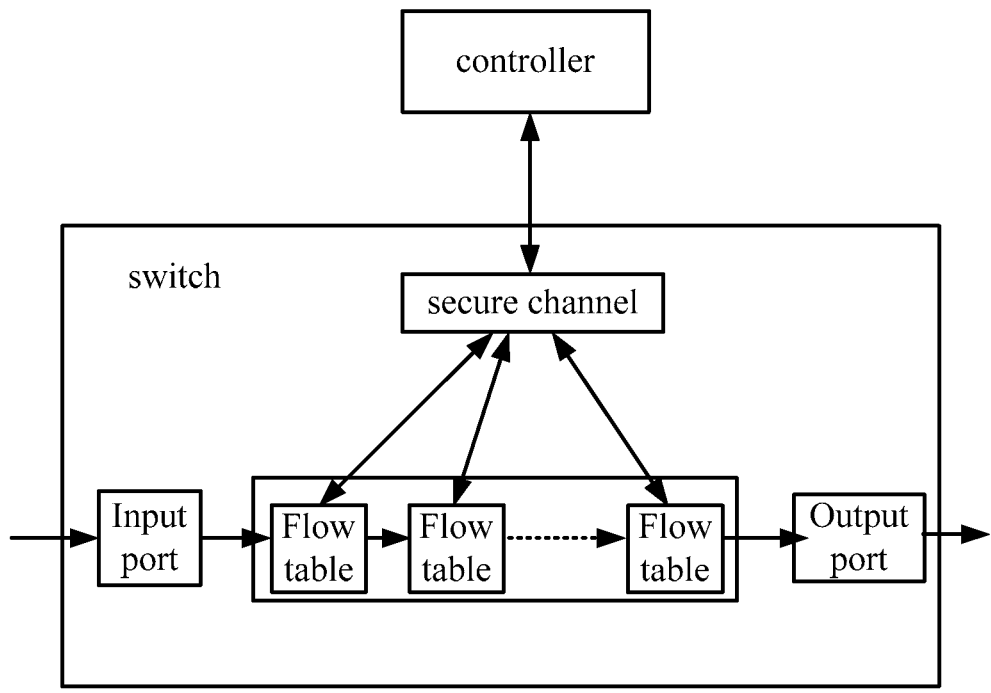
FIG. 1 is a schematic diagram of an example of a network architecture capable of applying an embodiment of the present disclosure.

FIG. 1 is a schematic diagram of an example of a network architecture capable of applying an embodiment of the present disclosure. It should be noted that, the example of FIG. 1 is only intended to help those skilled in the art to understand the embodiment of the present disclosure in a better way, rather than limiting the scope of the embodiment of the present disclosure. In FIG. 1, the architecture of an OpenFlow network is taken as an example for illustration.

As shown in FIG. 1, an Openflow switch includes one or multiple flow tables for achieving packet message matching and forwarding functions and a secure channel connected with an external Openflow controller. The secure channel of the Openflow switch and the Openflow controller interact through Openflow protocol messages, to operate the flow tables in the switch.

Each flow table includes one or multiple flow entries. The Openflow controller may add, update or delete the flow entries in the flow table by use of the Openflow protocol message. Each flow entry includes match field information and corresponding operation field information, wherein the operation field information may also called as Action field information or Instruction field information. After receiving a data packet from an input port, the switch begins to match from the first flow table, and then jumps to the next flow table for further matching. This sequentially cascaded flow table is called as a flow pipeline. The switch compares the received packet with the match field information of the flow entries in the flow table, and if a flow entry matched with the received packet exists in the flow table, corresponding operation in the operation field information in the flow entry is implemented. An operation field in the flow entry includes two types of information, the first type is to make the matched packet jump to the next flow table for further processing, and meanwhile, corresponding metadata may also be transmitted; and the second type is to modify and forward the data packet to an output port.

The OpenFlow switching device may be a device supporting an OpenFlow technology and having a switching function, which may be an OpenFlow switch, and is not limited in the embodiment of the present disclosure. In the following embodiments, the OpenFlow switching device may be called as switching device for short. The OpenFlow control device may be a device supporting the OpenFlow technology and having a control function, which may be an OpenFlow controller, and is not limited in the embodiment of the present disclosure. In the following embodiments, the OpenFlow control device is called as control device for short.

It should be noted that, in the embodiment of the present disclosure, although the OpenFlow network is taken as an example for illustration, the embodiment of the present disclosure may also be applied to other network architectures similar to the OpenFlow network and having separated control planes and forwarding planes. This is not limited in the embodiment of the present disclosure.

Figure 2:
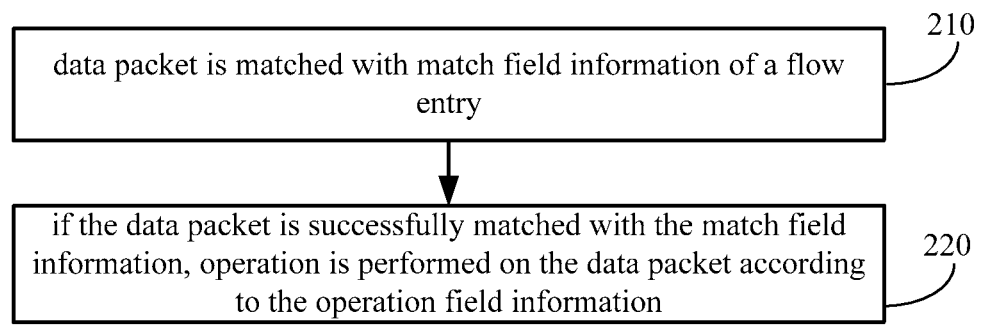
FIG. 2 is a schematic flowchart of a data packet processing method according to an embodiment of the present disclosure.

FIG. 2 is a schematic flowchart of a data packet processing method according to an embodiment of the present disclosure. The method of FIG. 2 is implemented by switching device, for example, a switch supporting an OpenFlow technology.

210, a data packet is matched with match field information of a flow entry.

The flow entry includes the match field information and operation field information.

Optionally, the operation field information includes an operation type and first bit field indication information, the first bit field indication information includes a first offset and a first field length, and the first bit field indication information is used for indicating the first bit field of the data packet.

When the operation field information includes the first bit field indication information, the beginning position of a particular bit field of the data packet in the data packet may be determined according to the first offset of the first bit field indication information, and the length of the particular bit field may be determined according to the first field length, thus the particular bit field may be acquired, and then corresponding operation may be performed on the particular bit field according to the operation type. Therefore, the particular bit field in the data packet may be freely acquired to perform the corresponding operation without being limited to a particular protocol format, so as to avoid standardized extension of a newly added protocol.

Optionally, the first bit field indication information further includes a first mask. After the particular bit field is acquired according to the first offset and the first field length, one or multiple bits in the bit field, namely at least one bit in the bit field, may be acquired according to the first mask, and then corresponding operation may be performed to the acquired one or multiple bits according to the operation type. Therefore, on the basis of freely acquiring the particular bit field of the data packet, one or multiple particular bits in the particular bit field may be freely acquired to perform corresponding operation, thus increasing the degree of freedom and universality of custom processing of the data packet.

Optionally, the match field information includes second bit field indication information and a match value, the second bit field indication information includes a second offset and a second field length, and the second bit field indication information is used for indicating the second bit field of the data packet.

If the value of the second bit field is equal to the match value, the second bit field is successfully matched with the match value, namely the data packet is successfully matched with the flow entry. The match value is corresponding to the second bit field indication information.

When the match field information includes the second bit field indication information, the beginning position of a particular bit field of the data packet in the data packet may be determined according to the second offset, and the length of the particular bit field may be determined according to the second field length, thus the particular bit field may be acquired, and then the bit field is matched according to the match value. Therefore, the particular bit field in the data packet may be freely acquired to for matching without being limited to the particular protocol format, so as to avoid the standardized extension of the newly added protocol.

Optionally, the second bit field indication information further includes a second mask. After the particular bit field is acquired according to the second offset and the second field length, one or multiple bits in the bit field, namely at least one bit in the bit field, may be acquired according to the second mask, and then the acquired one or multiple bits may be matched according to the match value. Therefore, on the basis of freely acquiring the particular bit field of the data packet, one or multiple particular bits in the particular bit field may be freely acquired for matching, thus increasing the degree of freedom and universality of custom processing of the data packet.

It should be noted that, in the embodiment of the present disclosure, the data packet may be a packet data-packet.

220, if the data packet is successfully matched with the match field information, operation is performed on the data packet according to the operation field information.

Optionally, when the operation field information includes the operation type and the first bit field indication information, the operation being performed on the data packet may include that the first bit field of the data packet is determined according to the first bit field indication information, and the operation is performed on the first bit field according to the operation type.

Optionally, when the first bit field indication information further includes the first mask, the operation being performed on the data packet may include that the first bit field of the data packet is determined according to the first bit field indication information, at least one bit of the first bit field is acquired according to the first mask, and the operation is performed on the at least one bit of the first bit field according to the operation type.

Optionally, when the operation field information includes the operation type and the first bit field indication information, and if the operation field information further includes an operand, the operation being performed on the first bit field according to the operation type may include that the operation is performed on the first bit field and the operand according to the operation type. Similarly, the operation being performed on the at least one bit of the first bit field according to the operation type may include that the operation is performed on the at least one bit of the first bit field and the operand according to the operation type.

In the embodiment of the present disclosure, the switching device may have a forwarding plane function while having no control plane function. The control plane function may be implemented by an external control device. In this case, the control device may parse context information of a protocol format and the protocol format of the data packet, and map the processing of the data packet into the match field information and/or operation field information in the flow entry, in order to make processing of a forwarding plane irrelevant to the specific protocol format.

In the embodiment of the present disclosure, since the operation field information in the flow entry includes the first bit field indication information, and the first bit field indication information includes the first offset and the first field length, the switching device may arbitrarily determine the first bit field in the data packet according to the first bit field indication information and operate the first bit field without parsing the specific protocol format of the data packet. Similarly, the switching device may arbitrarily determine the second bit field in the data packet according to the second bit field indication information and match the second bit field without parsing the specific protocol format of the data packet. In addition, even if the protocol format of the data packet does not exist in the existing specification, the switching device does not need to extend the existing specification with respect to the specific protocol format of the data packet, thereby flexible user-definable flow operation can be achieved and the standardized extension that continuously occurs for newly added protocols can be avoided. Therefore, in the embodiment of the present disclosure, the data packet processing method is more universal, and the application scenarios are more extensive. Comparatively speaking, since the types of the protocol formats supported in the existing OpenFlow specification are limited, if a data packet in a newly added protocol format needs to be processed, the existing specification needs to be further extended as for the newly added protocol format, which results in obese extensions.

In the embodiment of the present disclosure, by adopting the offset and the field length, flexible positioning of the particular bit field in the data packet can be achieved, and flexible custom processing of the data packet can be achieved, such that the processing of the data packet is not limited to the particular protocol format any more, the standardized extension of the newly added protocol is avoided, and the processing of the data packet is more universal.

In addition, when the match field information is a content defined by the existing OpenFlow technology, step 210 in which the switching device matches the data packet with the match field information of the flow entry may also be implemented according to the process that the switching device matches the data packet with the match field information of the flow entry in the related art. This is not limited in the embodiment of the present disclosure.

In addition, when the operation field information is a content defined by the existing OpenFlow technology, step 220 in which the switching device operates the data packet according to the operation field information may also be implemented according to the process that the switching device operates the data packet according to the operation field information in the related art. This is not limited in the embodiment of the present disclosure.

It should be noted that, in the embodiment of the present disclosure, the above-mentioned offset may be calculated from the beginning position of a grouping frame received from the input port of the switching device, and the unit may be octet (byte). The above-mentioned field length may express the number of bytes of continuous fields after the offset. The offset and the field length may be used for co-indicating a continuous byte segment with a determined length in the data packet. The above-mentioned mask may express a bit mask in the field co-indicated by the offset and the field length. The length of the mask may be equal to the field length.

Optionally, as another embodiment, the above-mentioned operation type may include a pop operation type, a push operation type, a Set-value operation type, a Calculate-Length operation type, a Calculate-Checksum operation type, a Verify-Checksum operation type, an increment operation type, a decrement operation type or a copy operation type.

Optionally, as another embodiment, prior to step 210, the switching device may receive a flow entry addition indication message sent by a control device, and the flow entry addition indication message may include match field information and operation field information. The switching device may generate a flow entry according to the received match field information and operation field information. Those of ordinary skill in the art should know that the flow entry may also be configured previously on the switching device.

Optionally, as another embodiment, prior to step 210, the switching device may receive a flow entry modification indication message sent by a control device, and the flow entry modification indication message may include match field information and new operation field information. The switching device may modify the flow entry according to the match field information and the new operation field information.

Optionally, as another embodiment, prior to step 210, the switching device may receive a feature request message sent by a control device, and the feature request message may be used for inquiring whether the switching device supports generic flow processing capacity, namely whether the above-mentioned match field information or the above-mentioned operation field information is supported. The switching device may send a feature response message to the control device, and the feature response message may be used for indicating that the generic flow processing capacity is supported, namely, the above-mentioned match field information or the above-mentioned operation field information is supported.

It should be noted that, in the embodiment of the present disclosure, the generic flow processing may refer to that the processing of the data packet by the switching device is not limited to the specific protocol format of the data packet, that is to say, the switching device may process the data packet without parsing the context information related to the specific protocol of the data packet and the format of the data packet.

Optionally, as another embodiment, the above-mentioned flow entry and the flow entry in the related art may coexist in the same flow table. Or the above-mentioned flow entry may be stored in a flow table independently.

As an optional implementation, the above-mentioned flow entry may be an extension to the existing flow entry, wherein for example, the above-mentioned operation field information and/or match field information may be added to the flow entry of the existing common flow table. The above-mentioned flow entry may also be independently stored in a flow table which is newly added in the switching device. In the embodiment of the present disclosure, in order to differ from other existing common flow tables, the newly added flow table may be called as a generic flow table. The generic flow table may be inserted in the existing flow pipeline, the other common flow tables in the flow pipeline may jump to the generic flow table, and the generic flow table may also jump back to the other common flow tables in the flow pipeline.

Figure 3:
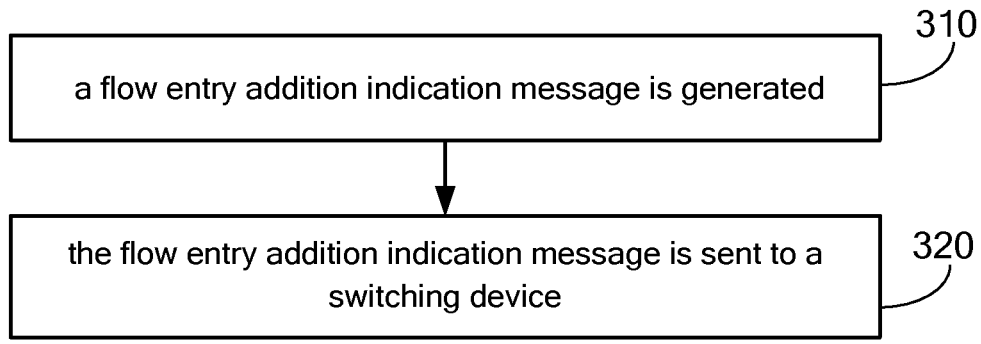
FIG. 3 is a schematic flowchart of a data packet processing method according to an embodiment of the present disclosure.

FIG. 3 is a schematic flowchart of a data packet processing method according to an embodiment of the present disclosure. The method of the FIG. 3 is implemented by a control device, for example, a controller supporting an OpenFlow technology.

310, a flow entry addition indication message is generated.

The flow entry addition indication message includes match field information and operation field information.

Optionally, the operation field information includes an operation type and first bit field indication information, the first bit field indication information includes a first offset and a first field length, and the first bit field indication information is used for indicating the first bit field of the data packet. Exemplarily, the operation field information may further include an operand. Exemplarily, the first bit field indication information may further include a first mask. Exemplarily, the operation type includes a pop operation type, a push operation type, a Set-value operation type, a Calculate-Length operation type, a Calculate-Checksum operation type, a Verify-Checksum operation type, an increment operation type, a decrement operation type or a copy operation type.

Optionally, the match field information includes second bit field indication information and a match value, the second bit field indication information includes a second offset and a second field length, and the second bit field indication information is used for indicating the second bit field of the data packet. Exemplarily, the second bit field indication information may further include a second mask.

320, the flow entry addition indication message is sent to a switching device.

After receiving the flow entry addition indication message, the switching device may generate a flow entry according to the flow entry addition indication message, namely according to the match field information and the operation field information carried in the flow entry addition indication message, and process the data packet according to the generated flow entry.

Optionally, if the flow entry in the switching device needs to be updated, in step 310, the control device may generate a flow entry modification indication message, and the flow entry modification indication message also includes the above-mentioned match field information and operation field information. Correspondingly, in step 320, the control device may send the generated flow entry modification indication message to the switching device. After receiving the flow entry modification indication message, the switching device may find a corresponding flow entry according to the match field information in the flow entry modification indication message, and then modify the operation field information of the corresponding flow entry into the operation field information carried in the flow entry modification indication message. In this way, the switching device may process the data packet according to the updated flow entry.

Optionally, when the operation field information includes the operation type and the first bit field indication information, or the match field information includes the second bit field indication information and the match value, the control device may send a feature request message to the switching device, and the feature request message is used for inquiring whether the switching device supports the bit field indication information or the match field information. Correspondingly, after sending the feature request message to the switching device, the control device receives a feature response message returned by the switching device, and the feature response message may be used for indicating that the match field information or the operation field information is supported, and may also be used for indicating that the match field information or the operation field information is not supported. By inquiring whether the switching device supports the match field information or the operation field information, the match field information or the operation field information may be prevented from being sent to the switching device which does not support the match field information or the operation field information, to prevent the switching device from wrongly adding or updating the flow entry, thus avoiding processing incorrectly the data packet using the flow entry.

In the embodiment of the present disclosure, by sending the bit field indication information carrying the offset and the field length to the switching device, flexible positioning of a particular bit field in the data packet can be achieved, and flexible custom processing of the data packet can be achieved, such that the processing of the data packet is not limited to a particular protocol format any more, standardized extension of a newly added protocol is avoided, and the processing of the data packet is more universal.

The embodiment of the present disclosure will be described below in detail in combination with specific examples. It should be noted that these examples are only intended to help those skilled in the art to understand the embodiment of the present disclosure in a better way, rather than limiting the scope of the embodiment of the present disclosure. Apparently, those skilled in the art may make a variety of equivalent modifications or variations according to these proposed examples, and these modifications or variations shall fall within the scope of the embodiments of the present disclosure.

Figure 4:
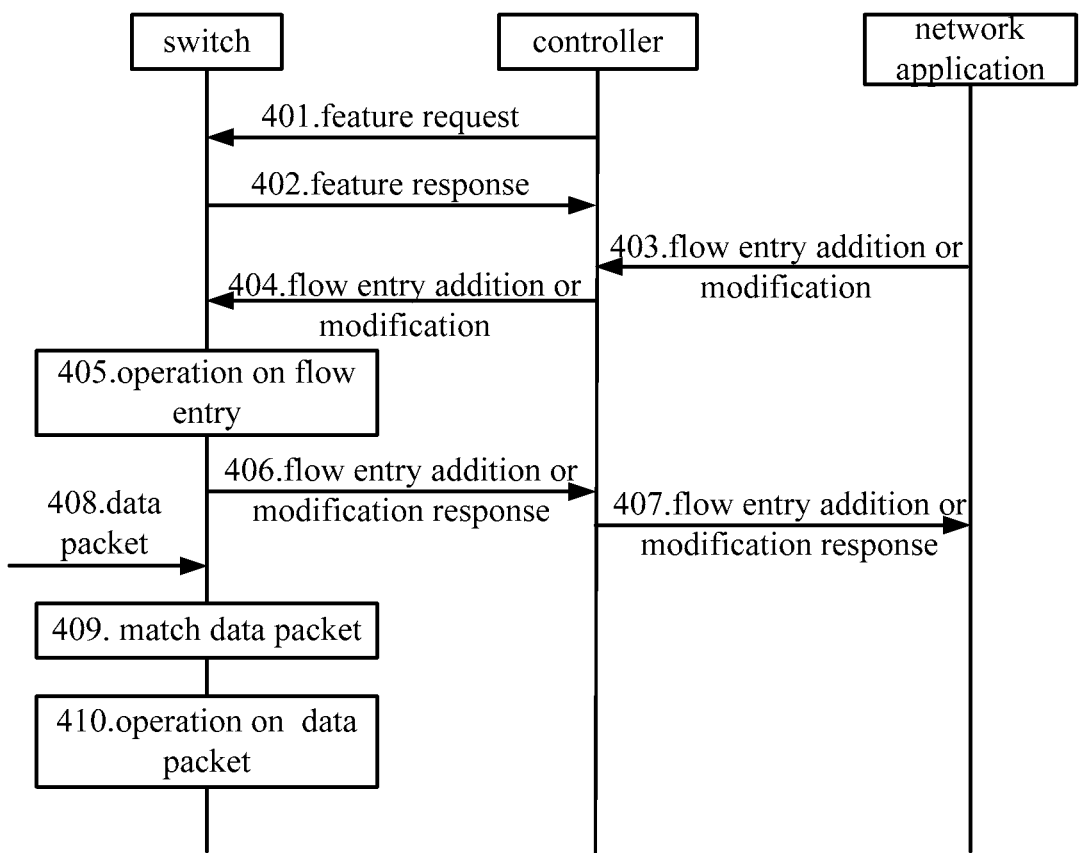
FIG. 4 is a schematic flowchart of a process of a data packet processing method according to an embodiment of the present disclosure.

FIG. 4 is a schematic flowchart of a process of a data packet processing method according to an embodiment of the present disclosure. In FIG. 4, a switching device is a switch, and a control device is a controller. The switch and the controller may communicate with each other. For example, a transport layer security (TLS) channel may be established between the switch and the controller, to perform a session through the TLS channel. In addition, in FIG. 4, a network application (Network App) layer and the controller may be integrated into a physical entity and may also be separate, and this is not limited in the embodiment of the present disclosure.

401, the controller sends a feature request message to the switch, wherein the feature request message is used for inquiring whether the switch supports generic flow processing capacity.

402, the switch sends a feature response message to the controller, wherein the feature response message is used for indicating that the switch supports the generic flow processing capacity.

In the embodiment of the present disclosure, whether the generic flow processing capacity is supported refers to whether the capacity of positioning a particular bit field by use of offset and a field length is supported. The capacity may be specifically expressed in a plurality of manners, for example, whether the processing of the first bit field indication information or the second bit field indication information in the embodiment as shown in FIG. 2 is supported, or for example, whether operation field information including the first bit field indication information or match field information including the second bit field indication information is supported, and this is not limited in the embodiment of the present disclosure.

For example, the switch may carry a generic flow processing capacity flag bit in the feature response message, to notify the controller that whether the generic flow processing capacity is supported through the flag bit.

403, the network application layer sends a flow entry addition indication message or a flow entry modification indication message to the controller, wherein the flow entry addition indication message or the flow entry modification indication message is used for indicating operation to be performed on the flow entry in the switch.

For example, the network application layer may map the operation on the switch into the operation on the flow entry according to service logic. The operation on the flow entry may include adding a flow entry, modifying a flow entry or the like. For example, the network application layer may send the flow entry addition indication message to the controller and may also call a flow table modification API (Application Programming Interface), and the flow entry addition indication message may carry the match field information and the operation field information. The network application layer may send the flow entry modification indication message to the controller, and the flow entry modification indication message may carry the match field information and new operation field information. In addition, the network application layer may also instruct to delete the flow entry through a flow entry deletion indication message.

404, the controller sends the flow entry addition indication message or the flow entry modification indication message to the switch.

The flow entry addition indication message may carry the match field information and the operation field information issued by the network application layer. The flow entry modification indication message may carry the match field information and the new operation field information issued by the network application layer.

In addition, the controller may also send a flow entry deletion indication message to the switch according to the flow entry deletion indication message issued by the network application layer.

405, the switch performs operation on the flow entry according to the flow entry addition indication message or the flow entry modification indication message sent by the controller.

For example, the switch may generate a flow entry according to the match field information and the operation field information carried in the flow entry addition indication message.

The switch may also performs operation on the flow entry according to the match field information and the new operation field information carried in the flow entry modification indication message. For example, the operation field information in the flow entry corresponding to the match field information carried in the flow entry modification indication message may be updated to the new operation field information.

406, the switch sends a flow entry addition response message or a flow entry modification response message to the controller.

The switch notifies the controller that the operation on the flow entry has been completed through the flow entry addition response message or the flow entry modification response message.

407, the controller sends the flow entry addition response message or the flow entry modification response message to the network application layer.

The controller notifies the network application layer that the switch has completed the operation on the flow entry through the flow entry addition response message or the flow entry modification response message.

401-407 exemplarily describes the method of operation of the controller for adding and updating the flow entry on the switch. The sending of the flow entry addition or modification response message by the controller may also be triggered by other conditions, and this is not limited in the embodiment of the present disclosure. It will be described how to perform data packet processing on the flow entry by the switch below.

408, the switch receives a data packet from another external network element.

409, the switch matches the data packet with the flow entry.

The above-mentioned flow entry may include match field information, the match field information may include second bit field indication information and a match value, the second bit field indication information may include a second offset and a second field length, and the second bit field indication information may be used for indicating the second bit field of the data packet.

The switch may determine the second bit field in the data packet according to the second bit field indication information. For example, the switch may determine the second bit field according to the second offset and the second field length. In addition, the second bit field indication information may further include a second mask. Then the switch may also determine a particular bit in the second bit field according to the second offset, the second field length and the second mask. For convenience of expression, the particular bit in the second bit field is also called as the second bit field hereinafter.

After determining the second bit field, the switch may match the second bit field according to the match value.

Specifically, if the value of the second bit field is equal to the match value, the second bit field is successfully matched with the match value, namely the data packet is successfully matched with the flow entry. In a match field, the match value is corresponding to the second bit field indication information.

Figure 5:
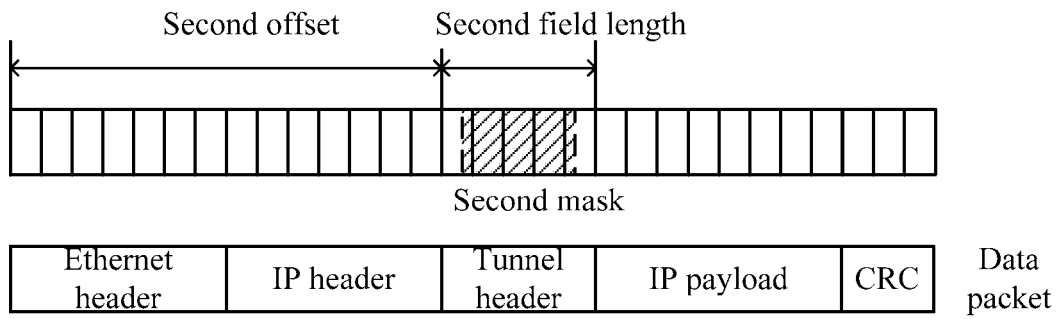
FIG. 5 is a schematic diagram of an example of a data packet matching process according to an embodiment of the present disclosure.

In the above-mentioned matching process, the switch may match the data packet with the flow entry without parsing the protocol format of the data packet. Therefore, the above-mentioned match field information may also be called as generic match field information. FIG. 5 is a schematic diagram of an example of a data packet matching process according to an embodiment of the present disclosure.

The match field information will be described below in detail in combination with specific examples. It should be noted that these examples are only intended to help those skilled in the art to understand the embodiment of the present disclosure in a better way, rather than limiting the scope of the embodiment of the present disclosure.

In one embodiment, the generic match field information proposed in the present disclosure is defined by use of a match field information format in the existing OpenFlow protocol. The content of the existing OpenFlow match field information may be described by use of an OXM (OpenFlow Extensible Match) TLV (Type-Length-Value) structure. Each OXM TLV may be as long as 5-259 bytes, and the header may occupy 4 bytes. An example of the header format of the OXM TLV structure is as shown in Table 1.

TABLE 1 an example of the OXM TLV structure

| | Name | Length (bit) | Description |
|---|---|---|---|
| OXM_TYPE | OXM_CLASS | 16 | Match class: member class or reserved class |
| | OXM_FIELD | 7 | Match field name corresponding to the match class |
| | OXM_HASMASK | 1 | Set if the content (Value) part of the OXM includes a bit mask |
| | OXM_LENGTH | 8 | Length of the OXM content (Value) part |
| | OXM_VALUE | 8 *OXM_LENGTH | OXM content, namely the match value |

The OXM_CLASS and the OXM_FIELD in the OXM_TYPE express match field name corresponding to the match field information in the flow entries, for example, an Ethernet destination address (ETH_DST). The OXM_VALUE is an OXM content and is used for recording a match value corresponding to the OXM_TYPE. The OXM_HASMASK in the OXM_TYPE indicates whether a part of bits in the OXM_VALUE need to be matched further through the mask in the determined second bit field. If the OXM_HASMASK is equal to 0, it indicates that all bits of the OXM_VALUE are used as match values; and if the OXM_HASMASK is equal to 1, it indicates that the bits corresponding to the mask part in the OXM_VALUE are used as the match values, and the value of a mask with the same byte length as the value of the OXM_VALUE follows the OXM_VALUE immediately.

In the embodiment of the present disclosure, the match field information may also adopt the format of the OXM structure. In order to differ from the OXM in the existing OpenFlow specification, the OXM structure adopted by the match field information in the embodiment of the present disclosure is called as a generic OXM structure. A newly defined member class may be introduced into the OXM_CLASS, for example, OFPXMC_HW_0, to indicate that the extension is defined by a certain ONF (Open Networking Foundation) member. A new match field type is introduced into the OXM_FIELD, for example, OXM_OF_GENERIC_FIELD, to indicate that the OXM is a generic match type. The OXM_VALUE is no longer a pure numerical value, but includes a second offset, a second field length, a second mask and a match value. In the Table 2 below, the second offset, the second field length, the second mask and the match value are respectively expressed by Offset, Size, Mask and Data. The four parameters may be arranged in a specified sequence, or each parameter may be defined as an independent sub-TLV structure, wherein Type is a parameter type, for example, as the second offset, the second field length, the second mask or the match value. Length expresses a length of byte(s) of the parameter, and Value means a specific numerical value of the parameter. In addition, if multiple bit fields need to be matched, multiple generic OXM may be added in the flow entries.

TABLE 2 an example of formats of the match field information

| Name | Type | Description |
|---|---|---|
| Type | unit16 | OXM_CLASS= OFPXMC_HW_0 OXM_FIELD=OXM_OF_GENERIC_FIELD |
| Len | unit16 | Total length of generic OXM |
| Value (bytes may be filled following this part to ensure that the total length is an integer multiple of 8 bytes) | | |
| Offset | unit16 | Second offset |
| Size | unit16 | Second field length |
| Mask[Size] | unit8 | Second mask. The byte length occupied by the Mask is determined by Size |
| Data[Size] | unit8 | Match value, namely the value of a second bit field. The length of a byte segment is determined by size |

With an IP (Internet Protocol) destination address (DA) in a data packet to be matched as an example, how to use the generic OXM defined by the embodiment of the present disclosure to describe a matched bit field will be illustrated below.

As shown in left column of Table 3, the left column is match field information described by adopting the OpenFlow standard OXM and used for matching the IP destination addresses, OXM_CLASS indicates that the following OXM is defined by the OpenFlow standard protocol, OXM_FIELD specifies the class of the currently matched bit field as an IPv4 destination address, OXM_HASMASK equal to 1 indicates that a mask is needed, and VALUE expresses a specific numerical value of the IPv4 address after being masked.

The right column of Table 3 is a manner for matching the IP destination addresses, described by adopting the generic OXM defined in the embodiment of the present disclosure. OXM_CLASS indicates that the OXM is defined by an ONF organization member by means of extension, the OXM_FIELD is identified as a generic match field class, OXM_HASMASK equal to 0 indicates that no mask is needed, and Value refers to the position and the value of the IPv4 destination address, described by adopting the second offset, the second field length, the second mask and the match value, in the data packet. Thus it can be seen from Table 3 that the match field information in the embodiment of the present disclosure is more universal.

TABLE 3 comparison of the match field information in the OpenFlow protocol and the match field information in the embodiment of the present disclosure

| OXM format of the match field information in the OpenFlow protocol | Generic OXM format of the match field information in the embodiment of the present disclosure |
|---|---|
| OXM_CLASS= OFPXMC_OPENFLOW_BASIC<br>OXM_FIELD =OFPXMT_OFB_IPV4_DST<br>OXM_HASMASK = 1<br>OXM_VALUE = 10.12.0.0/255.255.0.0 | OXM_CLASS= OFPXMC_HW_0<br><br>OXM_FIELD = OXM_OF_COMMOM_FIELD<br>OXM_HASMASK = 0<br>OXM_Value=30 (second offset)<br>4 (second field length)<br>255.255.0.0 (second mask)<br>10.12.0.0 (match value) |

In addition, the process that the switch matches the data packet with the flow entry may be performed according to the process that the switch matches the data packet with the flow entry in the related art. This is not limited in the embodiment of the present disclosure.

410, if the data packet is successfully matched with the flow entry, the switch performs operation on the data packet according to the flow entry.

The flow entry may include operation field information, the operation field information may include an operation type and first bit field indication information, the first bit field indication information may include a first offset and a first field length, and the first bit field indication information may be used for indicating the first bit field of the data packet.

Specifically, if the data packet is successfully matched with the flow entry, the switch may determine the first bit field in the data packet according to the first bit field indication information. For example, the switch may determine the first bit field according to the first offset and the first field length. In addition, the first bit field indication information may further include a first mask. In this way, the switch may also determine a particular bit in the first bit field according to the first offset, the first field length and the first mask. For convenience of expression, the particular bit in the first bit field is also called as the first bit field below.

After determining the first bit field, the switch may perform operation on the first bit field in the data packet according to the operation type.

Specifically, an operation field may further include an operand corresponding to the operation type. In this way, the switch may perform operation on the first bit field of the data packet and the operand according to the operation type.

Optionally, the operation type may include a pop operation type, a push operation type, a Set-value operation type, a Calculate-Length operation type, a Calculate-Checksum operation type, a Verify-Checksum operation type, an increment operation type, a decrement operation type or a copy operation type. It should be noted that, the operation type in the embodiment of the present disclosure is not limited to the operation types listed above, and may include other operation types, which is not limited in the embodiment of the present disclosure.

Specific expressions and descriptions of the operation types listed above may refer to Table 4. In Table 4, the first offset may include Top-offset and/or Bottom-offset. The Top-offset may be calculated from the beginning position of a packet frame received from the input port of the switch, and the Bottom-offset may be calculated from the tail position of the packet frame. The Top-offset and the Bottom-offset may be used for co-indicating a continuous byte segment. In addition, in Table 4, Size expresses the first field length, and the first field length may include Size 1 and Size 2. Data or Step expresses the operand, and Mask expresses the first mask.

TABLE 4 expressions and descriptions of the operation types and the corresponding first bit field indication information in the operation field information

| Serial number | Operation type | Expression | Description |
|---|---|---|---|
| 1 | Pop operation type | Pop (Top-offset, Size) | An specified bit field is popped. The operation type may be used for decapsulating a tunnel header. |
| 2 | push operation type | Push (Top-offset, Size, Data) | A bit field with length of Size bytes and value of Data is pushed at Top-offset. The operation type is used for encapsulating the tunnel header. |
| 3 | Set-value operation type | Set-value (Top-offset, Size, Mask, Data) | The value of the bit field specified by the Top-offset, the Size and the Mask is set to a value Data. The operation type may be used for modifying the value of the specified bit field. |
| 4 | Calculate-Length operation type | Calculate-Length (Top-offset1, Bottom-offset1, Top-offset2, Size2) | The byte length of a bit field 1 (specified by Top-offset1 and Bottom-offset1) is calculated, and the byte length of the bit field 1 is stored in a bit field 2 |

TABLE 4-continued expressions and descriptions of the operation types and the corresponding first
bit field indication information in the operation field information

| Serial number | Operation type | Expression | Description |
|---|---|---|---|
| 5 | Calculate-Checksum operation type | Calculate-Checksum (Top-offset1, Size1/Bottom-offset1, Top-offset2, Size2) | (specified by Top-offset2 and Size2). The operation type is mainly used for calculating a payload length. The checksum of the bit field 1 (the bit field 1 is specified by the Top-offset1 and the Bottom-offset1 or size1) is calculated, and the checksum is stored in the bit field 2 (the bit field 2 is specified by the Top-offset2 and the Size2). The operation type is mainly used for calculating the payload checksum. |
| 6 | Verify-Checksum operation type | Verify-Checksum (Top-offset1, Size1/Bottom-offset1, Top-offset2, Size2) | The checksum of the bit field 1 (the bit field 1 is specified by the Top-offset1 and the Bottom-offset1 or Size1) is calculated, and the checksum is compared with an original checksum stored in the bit field 2 (the bit field 2 is specified by the Top-offset2 and the Size2). If they are not equal, subsequent operation is terminated, and error information is reported to the controller. |
| 7 | increment operation type | Increment (Top-offset, Size, Mask, Step) | The size of Step is increased in the value of a field specified by the Top-offset and the Size. The operation type may be used for progressively increasing a sequence number. When being increased to a set maximum value, event notification is reported to the controller. |
| 8 | decrement operation type | Decrement (Top-offset, Size, Mask, Step) | The size of Step is progressively decreased in the value of the bit field specified by the Top-offset and the Size. When reaching a set minimum value, event notification is reported to the controller. |
| 9 | copy operation type | Copy (Top-offset1, Size1, Top-offset2, Size2) | The content of the bit field 1 (the bit field 1 is specified by the Top-offset1 and the Size1) is copied to the bit field 2 (the bit field 2 is specified by the Top-offset2 and the Size2). |

The above-mentioned operation field information may also adopt a TLV structure. An example of the TYPE definition of the above-mentioned operation types may refer to Table 5.

TABLE 5 an example of type values of the operation types in the operation field information

| TYPE title | Value | Description |
|---|---|---|
| OFPAT_GENERIC_POP | 31 | Bit field Pop operation |
| OFPAT_GENERIC_PUSH | 32 | Bit field Push operation |
| OFPAT_GENERIC_SET_VALUE | 33 | Bit field Set-value operation |
| OFPAT_GENERIC_CALCULATE_LENGTH | 34 | Bit fieldCalculate-Length operation |
| OFPAT_GENERIC_CALCULATE_CHECKSUM | 35 | Bit field Calculate-Checksum operation |

TABLE 5-continued an example of type values of the operation types in the operation field information

| TYPE title | Value | Description |
|---|---|---|
| OFPAT_GENERIC_VERIFY_CHECKSUM | 36 | Bit field Verify-Checksum operation |
| OFPAT_GENERIC_INCREMENT | 37 | Bit field value increment operation |
| OFPAT_GENERIC_DECREMENT | 38 | Bit field value decrement operation |
| OFPAT_GENERIC_COPY | 39 | Bit field value copy operation |

Examples of the above-mentioned operation types and the structures of the first bit field indication information corresponding to the operation types will be described below with reference to Table 6 to Table 14.

TABLE 6 an example of the pop operation type and the structure of the corresponding first bit field indication information

| Name | Type | Description |
|---|---|---|
| Type | unit16 | OFPAT_GENERIC_POP |
| Len | unit16 | Total length of the structure |
| Value (bytes may be filled following this part to ensure that the total length is an integer multiple of 8 bytes) | | |
| Top-offset | unit16 | Top offset |
| Size | unit16 | Field length |

TABLE 7 an example of the push operation type and the structure of the corresponding first bit field indication information

| Name | Type | Description |
|---|---|---|
| Type | unit16 | OFPAT_GENERIC_PUSH |
| Len | unit16 | Total length of the structure |
| Value (bytes may be filled following this part to ensure that the total length is an integer multiple of 8 bytes) | | |
| Top-offset | unit16 | Top offset |
| Size | unit16 | Field length |
| Data[Size] | unit8 | Value of a pushed bit field, the length of the bit field is determined by size |

TABLE 8 an example of the Set-value operation type and the structure of the corresponding first bit field indication information

| Name | Type | Description |
|---|---|---|
| Type | unit16 | OFPAT_GENERIC_SET_VALUE |
| Len | unit16 | Total length of the structure |
| Value (bytes may be filled following this part to ensure that the total length is an integer multiple of 8 bytes) | | |
| Top-offset | unit16 | Top offset |
| Size | unit16 | Byte segment length |
| Mask[Size] | unit8 | Mask, byte length occupied by Mask is determined by Size |
| Data[Size] | unit8 | Value of a pushed bit field, the length of the bit field is determined by Size |

TABLE 9 an example of the Calculate-Length operation type and the structure of the corresponding first bit field indication information

| Name | Type | Description |
|---|---|---|
| Type | unit16 | OFPAT_GENERIC_CALCULATE_LENGTH |
| Len | unit16 | Total length of the structure |
| Value (bytes may be filled following this part to ensure that the total length is an integer multiple of 8 bytes) | | |
| Top-offset 1 | unit16 | Top offset 1 |
| Bottom-offset1 | unit16 | Bottom offset 1 |
| Top-offset 2 | unit16 | Top offset 2 |
| Size 2 | unit16 | Length of bit field 2 |

TABLE 10 an example of the Calculate-Checksum operation type and the structure of the corresponding first bit field indication information

| Name | Type | Description |
|---|---|---|
| Type | unit16 | OFPAT_GENERIC_CALCULATE_CHECKSUM |
| Len | unit16 | Total length of the structure |
| Value (bytes may be filled following this part to ensure that the total length is an integer multiple of 8 bytes) | | |
| Top-offset 1 | unit16 | Top offset 1 |
| Bottom-offset1/Size1 | unit16 | Bottom offset 1 or field length 1 |
| Top-offset 2 | unit16 | Top offset 2 |
| Size 2 | unit16 | Length of bit field 2 |

TABLE 11 an example of the Verify-Checksum operation type and the structure of the corresponding first bit field indication information

| Name | Type | Description |
|---|---|---|
| Type | unit16 | OFPAT_GENERIC_VERIFY_CHECKSUM |
| Len | unit16 | Total length of the structure |
| Value (bytes may be filled following this part to ensure that the total length is an integer multiple of 8 bytes) | | |
| Top-offset 1 | unit16 | Top offset 1 |
| Bottom-offset1/Size1 | unit16 | Bottom offset 1 or field length 1 |
| Top-offset 2 | unit16 | Top offset 2 |
| Size 2 | unit16 | Length of bit field 2 |

TABLE 12 an example of the increment operation type and the structure of the
corresponding first bit field indication information

| Name | Type | Description |
|---|---|---|
| Type | unit16 | OFPAT_GENERIC_INCREMENT |
| Len | unit16 | Total length of the structure |
| Value (bytes may be filled following this part to ensure that the total length is an integer multiple of 8 bytes) | | |
| Top-offset | unit16 | Top offset |
| Size | unit16 | Field length |
| Mask[Size] | uint8 | Mask, byte length occupied by Mask is determined by Size |
| Step | unit16 | Incremental value size |

TABLE 13 an example of the decrement operation type and the structure of the
corresponding first bit field indication information

| Name | Type | Description |
|---|---|---|
| Type | unit16 | OFPAT_GENERIC_DECREMENT |
| Len | unit16 | Total length of the structure |
| Value (bytes may be filled following this part to ensure that the total length is an integer multiple of 8 bytes) | | |
| Top-offset | unit16 | Top offset |
| Size | unit16 | Field length |
| Mask[Size] | uint8 | Mask, byte length occupied by Mask is determined by Size |
| Step | unit16 | Decremental value size |

TABLE 14 an example of the copy operation type and the structure of the
corresponding first bit field indication information

| Name | Type | Description |
|---|---|---|
| Type | unit16 | OFPAT_GENERIC_COPY |
| Len | unit16 | Overall length of the structure |
| Value (bytes may be filled following this part to ensure that the total length is an integer multiple of 8 bytes) | | |
| Top-offset 1 | unit16 | Top offset 1 |
| Size1 | unit16 | Field length 1 |
| Top-offset 2 | unit16 | Top offset 2 |
| Size 2 | unit16 | Field length 2 |

It should be noted that, in the above-mentioned Table 6 to Table 14, the first offset may include the Top-offset and/or the Bottom-offset, and may also include the Top-offset1, the Top-offset2 and the Bottom-offset1. In addition, Size expresses the first field length, and the first field length may include the Size1 and the Size2. Data or Step expresses an operand, and Mask expresses the first mask.

In Table 6 to Table 14, each parameter (e.g., Top-offset, Bottom-offset, Size, Mask, Data, Step) involved in the Value parts in the operation types and the structures of the corresponding first bit field indication information may also be described by adopting independent TLV structures, wherein Type expresses a parameter type, for example, as Offset, Size, Mask, Data or Step, the Length expresses the byte length of the parameter, and Value expresses the specific numerical value of the parameter.

It should be noted that, the examples in the above-mentioned Table 4 to Table 14 are only intended to help those skilled in the art to better understand the embodiment of the present disclosure, rather than limiting the scope of the embodiment of the present disclosure. Apparently, those skilled in the art may make a variety of equivalent modifications or variations according to these proposed examples, and these modifications or variations shall fall within the scope of the embodiment of the present disclosure.

In the above-mentioned operation processes, the switch may perform operation on the data packet without parsing the protocol format of the data packet. Therefore, the above-mentioned operation field information may also be called as generic action field information.

In addition, step 410 in which the switch operates the data packet may also be performed according to the operation manner in the related art, and this is not limited in the embodiment of the present disclosure.

It should also be noted that, in FIG. 4, step 401 to step 402 and step 403 to step 407 do not need to be performed prior to every data packet processing, and for example, may be performed once during startup, or step 403 to step 407 is performed when it is needed to configure the flow entry. In this way, in the subsequent data packet processing process, step 401 to step 402 and step 403 to step 407 do not need to be performed. In this way, the switch may directly perform step 409 and step 410 after receiving the data packet.

It should be noted that, the values of the sequence numbers of the above-mentioned processes do not mean the performed order, and the performed order of the processes should be determined by the functions and internal logic thereof, rather than constituting any limit to the implementation process of the embodiment of the present disclosure.

In the embodiment of the present disclosure, by determining the first bit field of the data packet according to the first bit field indication information including the first offset and the first field length in the operation field information, and performing operation on the first bit field according to the operation type in the operation field information, the operation on the data packet is not limited to a particular protocol format any more, thus standardized extension of a newly added protocol is avoided, and full user-definable flow operation may be achieved.

In addition, in the embodiment of the present disclosure, by determining the second bit field of the data packet according to the second bit field indication information including the second offset and the second field length in the match field information, and matching the second bit field according to the match value, the matching of the data packet is not limited to the particular protocol format any more, thus the standardized extension of the newly added protocol is avoided, and the full user-definable flow operation may be achieved.

The types of protocol formats in the existing OpenFlow specification are limited, resulting in limited application scenarios. For example, the existing OpenFlow specification does not support a variety of processes of tunnel encapsulation and decapsulation. At present, only the pop and push operations of VLAN (Virtual Local Area Network) and MPLS (Multi-Protocol Label Switching, multi-protocol label switching) may be performed, while as for PPPoE, L3 tunnel encapsulation and decapsulation lack a necessary processing mechanism.

With a GTP (GPRS (General Packet Radio Service) Tunneling Protocol) protocol as an example, a process of creating a GTP tunnel based on the method of the embodiment of the present disclosure will be illustrated below in detail. It should be noted that, the examples of FIG. 6 to FIG. 10 are only intended to help those skilled in the art to better understand the embodiment of the present disclosure, rather than limiting the scope of the embodiment of the present disclosure.

Figure 6:
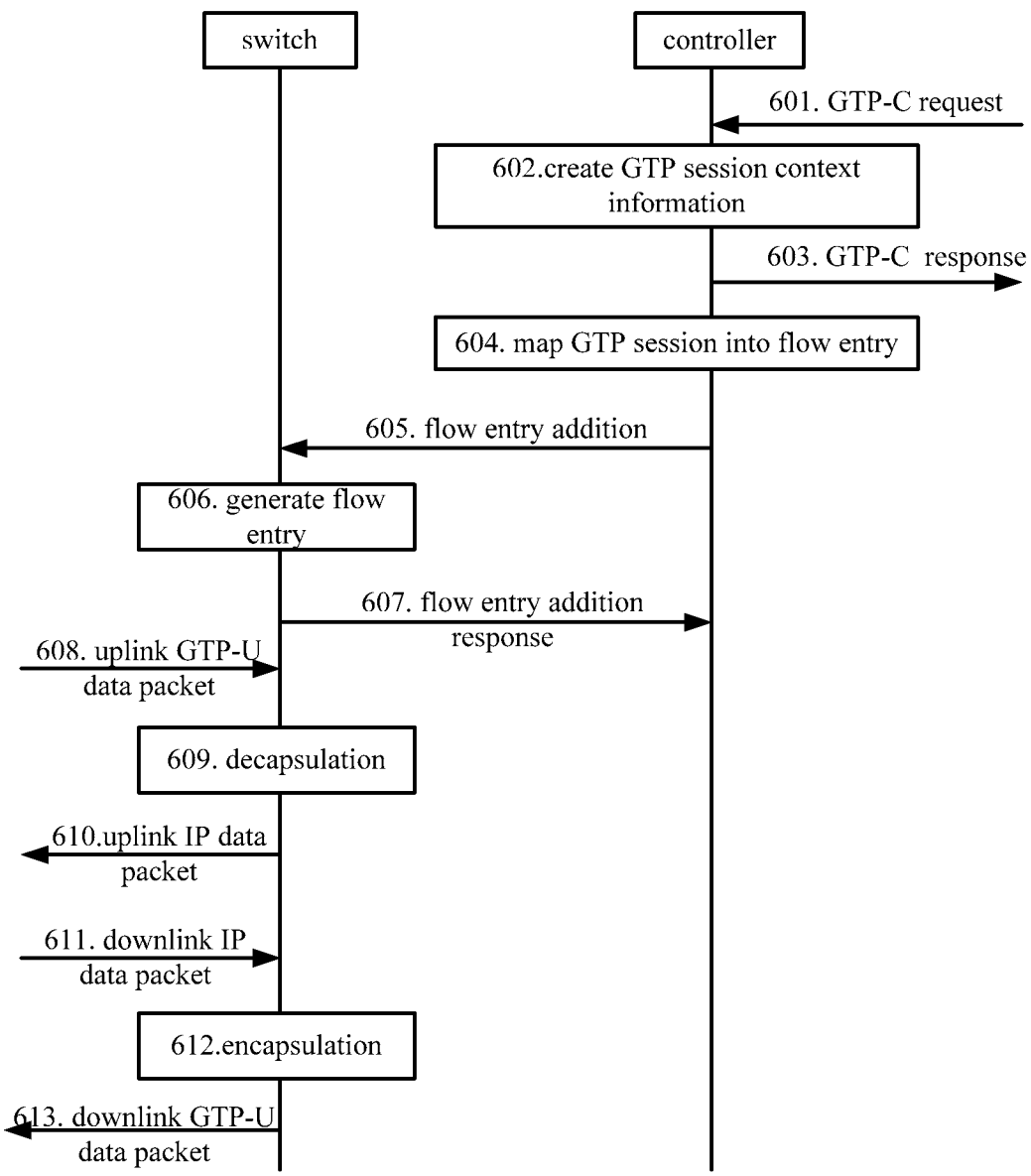
FIG. 6 is a schematic flowchart of an example of a process of a data packet processing method according to an embodiment of the present disclosure.

FIG. 6 is a schematic flowchart of an example of a process of a data packet processing method according to an embodiment of the present disclosure. Exemplarily, a control device herein is a controller, and a switching device is a switch.

601, the controller receives a GTP-C (GTP-Control) request message.

For example, the controller receives a create session request message. The message may come from another external network element and may also come from other logic entities of this network element. This is not limited in the embodiment of the present disclosure.

602, the controller creates GTP session information.

For example, the controller may create GTP-U user plane context information, for example, including user ID, bearing TEID (Tunnel Endpoint Identifier), a QoS (Quality of Service) parameter, a charging parameter or the like.

603, the controller returns a GTP-C creation response message.

604, the controller maps GTP session context information into match field information and operation field information of a flow entry in the switch.

Optionally, the match field information includes second bit field indication information and a match value, the second bit field indication information includes a second offset and a second field length, and the second bit field indication information is used for indicating the second bit field of the data packet. The second bit field indication information may further include a second mask.

Optionally, the operation field information includes an operation type and first bit field indication information, the first bit field indication information includes a first offset and a first field length, and the first bit field indication information is used for indicating the first bit field of the data packet. The first bit field indication information may further include a first mask.

Examples of the match field information and the operation field information may refer to descriptions in FIG. 2 or FIG. 4, and will not be repeated redundantly herein.

605, the controller sends a flow entry addition indication message to the switch, wherein the flow entry addition indication message carries the match field information and the operation field information.

606, the switch generates a flow entry according to the match field information and the operation field information carried in the flow entry addition indication message.

607, the switch sends a flow entry addition response message to the controller.

608, the switch receives an uplink GTP-U data packet from another external network element.

The switch may receive the uplink GTP-U data packet from another external network element.

609, the switch matches the data packet in step 608 according to the match field information of the flow entry, and performs a GTP-U decapsulation operation on the data packet according to the operation field information after the matching is successful.

610, the switch forwards an IP data packet acquired by decapsulation in step 609.

611, the switch receives a downlink IP data packet from another network element.

612, the switch performs a GTP-U encapsulation operation on the data packet according to the match field information and the operation field information in the flow entry.

613, the switch performs operation on a GTP-U data packet acquired by encapsulation in step 612.

In the embodiment, examples of matching of the data packet according to the match field information and processing of the data packet according to the operation field information may refer to descriptions in FIG. 2 or FIG. 4, and will not be repeated redundantly herein.

In FIG. 6, at a GTP-C signaling stage, the controller creates the GTP session context information according to the GTP-C request message and maps the subsequent GTP-U decapsulation or encapsulation operation into the match field information and the operation field information of the flow entry. The switch generates the flow entry according to the match field information and the operation field information, and may determine a corresponding bit field of the subsequent GTP-U data packet through the first bit field indication information or the second bit field indication information, and directly process and forward the data packet without parsing the protocol format of the data packet.

In the embodiment of the present disclosure, the flow entry is generated according to the match field information and the operation field information sent by the controller, so that the switch may directly perform tunnel encapsulation or decapsulation processing on the GTP-U data packet without parsing the protocol format of the data packet, and flexible user-definable flow operation can be achieved.

Figure 7:
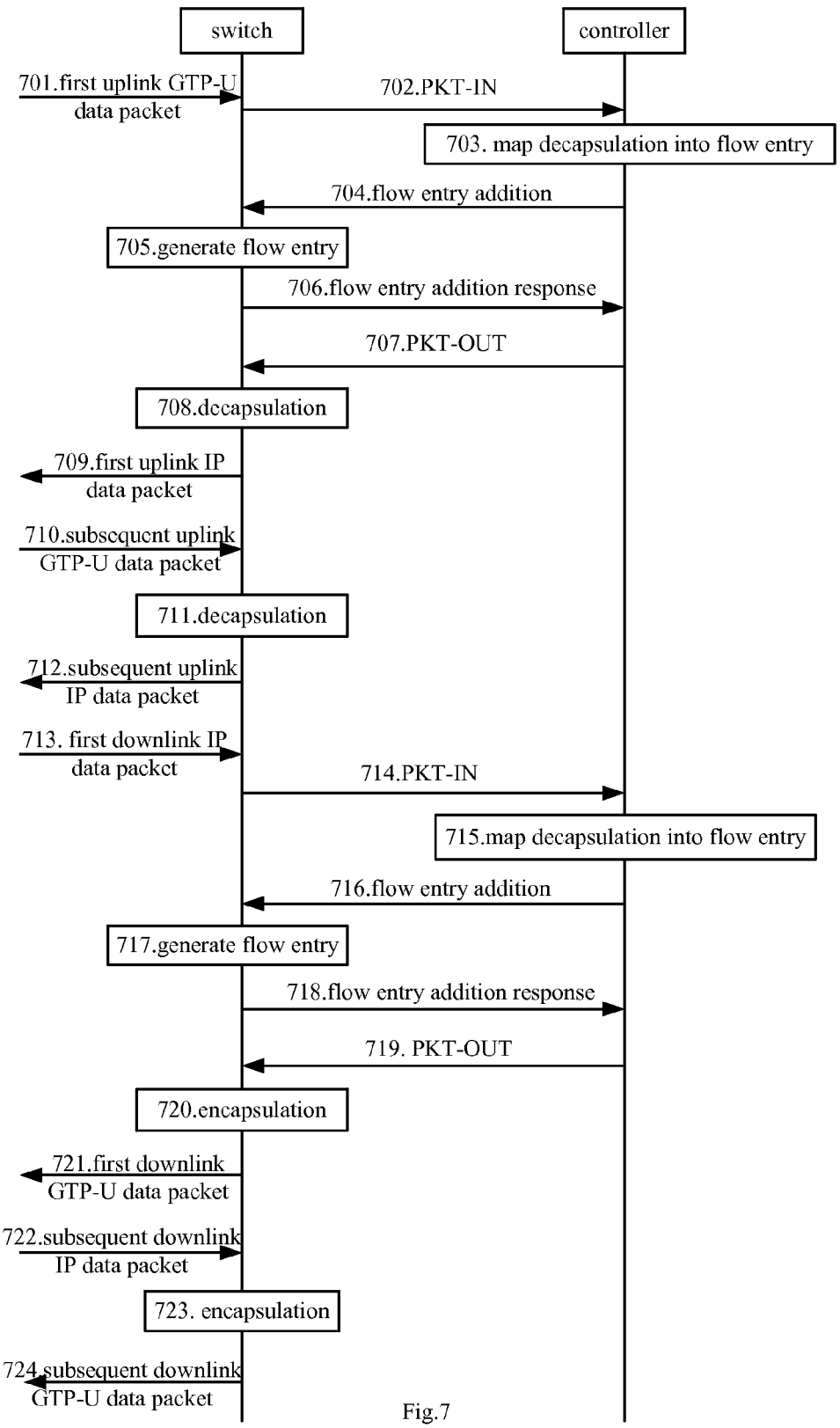
FIG. 7 is a schematic diagram of another example of a process of a data packet processing method according to an embodiment of the present disclosure.

FIG. 7 is a schematic diagram of another example of a process of a data packet processing method according to an embodiment of the present disclosure. Exemplarily, a switching device in the embodiment is a switch, and a control device is a controller.

701, the switch receives the first uplink GTP-U data packet from another network element.

It is assumed herein that the switch has not received any uplink GTP-U data packet before.

702, the switch sends the first uplink GTP-U data packet in step 701 to the controller through a PKT-IN (Packet-in, data packet input) message.

Since no corresponding flow entry for processing of the data packet was created in the switch initially, the switch may forward the first uplink GTP-U data packet to the controller through the PKT-IN message.

703, the controller parses the first uplink GTP-U data packet, and maps decapsulation processing into match field information and operation field information of a flow entry if it is determined that a GTP decapsulation operation needs to be performed on the data packet.

704, the controller sends a flow entry addition indication message to the switch, wherein the flow entry addition indication message carries the match field information and the operation field information in step 703.

Optionally, the match field information includes second bit field indication information and a match value, the second bit field indication information includes a second offset and a second field length, and the second bit field indication information is used for indicating the second bit field of the data packet. The second bit field indication information may further include a second mask.

Optionally, the operation field information includes an operation type and first bit field indication information, the first bit field indication information includes a first offset and a first field length, and the first bit field indication information is used for indicating the first bit field of the data packet. The first bit field indication information may further include a first mask.

Examples of the match field information and the operation field information may refer to descriptions in FIG. 2 or FIG. 4, and will not be repeated redundantly herein.

705, the switch generates a flow entry according to the match field information and the operation field information in step 704.

706, the switch sends a flow entry addition response message to the controller.

707, the controller returns the first uplink GTP-U data packet to the switch through a PKT-OUT (Packet-out, data packet output) message.

708, the switch matches the first uplink GTP-U data packet according to the match field information of the flow entry, and performs a decapsulation operation on the first uplink GTP-U data packet according to the operation field information after the matching is successful.

709, the switch forwards the first uplink IP data packet acquired by decapsulation.

710, the switch receives a subsequent uplink GTP-U data packet from another network element.

711, the switch matches the subsequent uplink GTP-U data packet according to the match field information of the flow entry, and performs a decapsulation operation on the subsequent uplink GTP-U data packet according to the operation field information after the matching is successful.

712, the switch forwards a subsequent IP data packet acquired by decapsulation.

713, the switch receives the first downlink IP data packet from another external network element.

714, the switch sends the first downlink IP data packet in step 713 to the controller through the PKT-IN (Packet-in) message.

Since no corresponding flow entry for processing of the data packet was created in the switch initially, the switch may forward the first downlink IP data packet to the controller through the PKT-IN message.

715, the controller parses the first IP data packet and maps encapsulation processing into the match field information and the operation field information of the flow entry if it is determined that a GTP-U encapsulation processing needs to be performed on the data packet.

716, the controller sends the flow entry addition indication message to the switch, wherein the flow entry addition indication message carries the match field information and the operation field information.

717, the switch generates the flow entry according to the match field information and the operation field information of the flow entry.

718, the switch sends the flow entry addition response message to the controller.

719, the controller returns the first downlink IP data packet to the switch through the PKT-OUT message.

720, the switch matches the first downlink IP data packet according to the match field information of the flow entry, and performs a encapsulation operation on the first downlink IP data packet according to the operation field information after the matching is successful.

721, the switch forwards the first GTP-U data packet acquired by encapsulation.

722, the switch receives a subsequent downlink IP data packet from another external network element.

723, the switch matches the subsequent downlink IP data packet according to the match field information of the flow entry, and performs a encapsulation operation on the subsequent downlink IP data packet according to the operation field information after the matching is successful.

724, the switch forwards the subsequent downlink GTP-U data packet acquired by encapsulation.

In the embodiment, examples of matching of the data packet according to the match field information and processing of the data packet according to the operation field information may refer to descriptions in FIG. 2 or FIG. 4, and will not be repeated redundantly herein.

In FIG. 7, at a GTP-C signaling stage, no flow entry is created. When a GTP-U data packet arrives, the first data packet is firstly forwarded to the controller, and the controller parses the data packet and maps the GTP-U decapsulation or encapsulation processing into the match field information and the operation field information of the flow entry. The switch generates the flow entry according to the match field information and the operation field information, and may directly determine a particular bit field of the subsequent GTP-U data packet according to the first bit field indication information or the second bit field indication information, and process and forward the data packet without parsing the protocol format of the data packet.

In the embodiment of the present disclosure, the flow entry is generated according to the match field information and the operation field information sent by the controller, so that the switch may directly perform tunnel encapsulation or decapsulation processing on the GTP-U data packet without parsing the protocol format of the data packet, and flexible user-definable processing of the data packet may be achieved.

Figure 8:
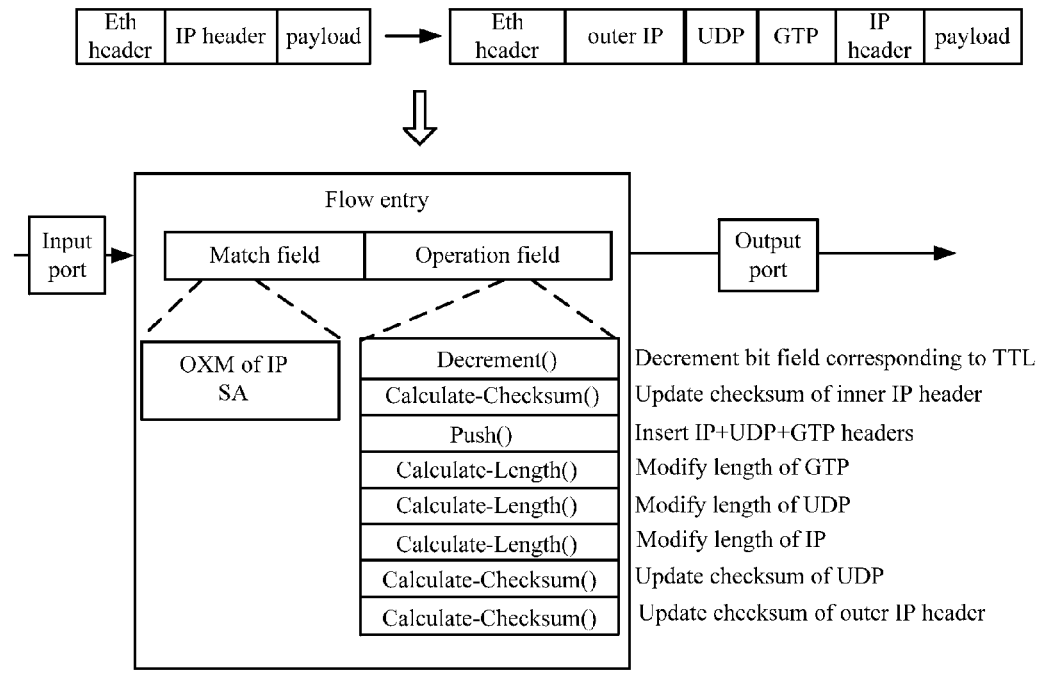
FIG. 8 is a schematic diagram of another example of a process of a data packet processing method according to an embodiment of the present disclosure.

FIG. 8 is a schematic diagram of another example of a process of a data packet processing method according to an embodiment of the present disclosure. Exemplarily, a switching device in the embodiment is a switch, and a control device is a controller.

In FIG. 8, with a GTP protocol as an example, after the switch creates a flow entry and when the switch receives an IP data packet, how to perform a GTP tunnel encapsulation processing according to the flow entry is described.

Match field information includes second bit field indication information and a match value, the second bit field indication information includes a second offset and a second field length, and the second bit field indication information is used for indicating the second bit field of the data packet.

The switch may match a second bit field determined by the second bit field indication information in the match field information and corresponding to an IP source address (SA), namely, the switch determines the bit field where the IP SA in the IP data packet is located according to the second bit field indication information in the OXM indicating the IP SA, and compares to determine whether the value of the bit field is equal to the match value in the OXM.

If the value of the bit field is equal to the match value in the OXM, after the matching is successful, the switch may implement the operation type in the operation field information of the flow entry. The control device may determine that GTP encapsulation needs to be performed on the data packet by means of the foregoing GTP session creation operation or parse of the first GTP-U data packet.

The switch has created the flow entry according to the foregoing flow entry addition indication message sent by the controller. The operation field information in the flow entry may include multiple groups of operation types corresponding to encapsulation processing and first bit field indication information corresponding to the operation types, wherein a GTP encapsulation header may include an outer layer IP header, a UDP (User Data gram Protocol) header and a GTP header, the outer layer IP header includes a source endpoint address and a destination endpoint address of a tunnel, and the GTP encapsulation header may further include allocated TEID. The encapsulation processing may include the following several groups of operation types and the first bit field indication information corresponding to the operation types:

(1) operation of minus 1 is performed on a bit field corresponding to TTL (Time To Live) in the IP data packet according to a decrement operation type and the corresponding first bit field indication information, namely, Decrement (Top-offset, Size, Mask, Step).

(2) A checksum of an inner layer IP data packet header is updated according to a check calculation operation type and the corresponding first bit field indication information, namely, Calculate-Checksum (Top-offset1, Bottom-offset1, Top-offset2, Size2).

(3) The IP data packet is encapsulated by use of an IP-UDP-GTP header according to a push operation type and the corresponding first bit field indication information, namely, push (Top-offset, Size, Data).

(4) The lengths of corresponding Length fields in the GTP, UDP and the outer layer IP headers are respectively updated according to triple Calculate-Length operation types and the corresponding first bit field indication information, namely, triple Calculate-Length (Top-offset1, Bottom-offset1, Top-offset2, Size2).

(5) The numerical values of corresponding checksum fields in the UDP and the outer layer IP headers are respectively updated according to double Calculate-Checksum operation types and the corresponding first bit field indication information, namely, double Calculate-Checksum (Top-offset1, Size1/Bottom-offset1, Top-offset2, Size2).

In the embodiment of the present disclosure, the flow entry is generated according to the match field information and the operation field information sent by the controller, so that the switch may directly determine and process a particular bit field in the GTP-U data packet without parsing the protocol format of the data packet, and flexible user-definable processing of the data packet can be achieved.

Figure 9:
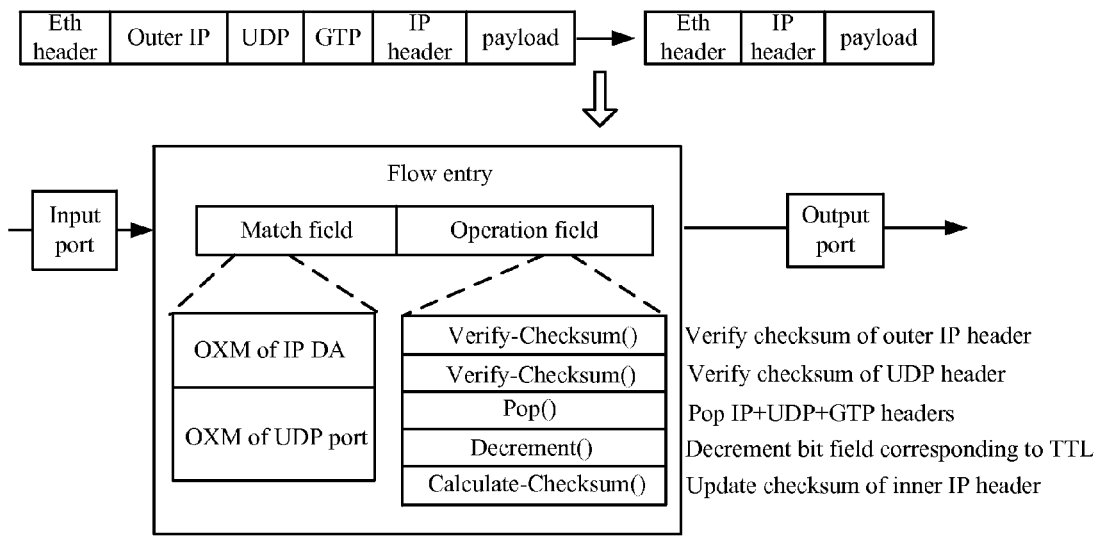
FIG. 9 is a schematic diagram of another example of a process of a data packet processing method according to an embodiment of the present disclosure.

FIG. 9 is a schematic diagram of another example of a process of a data packet processing method according to an embodiment of the present disclosure. In the embodiment, a switching device is a switch, and a control device is a controller.

In FIG. 9, with a GTP protocol as an example, after the switch creates a flow entry and when the switch receives a GTP-U data packet, how to perform GTP tunnel decapsulation processing according to the flow entry is described.

A match field of the flow entry includes two groups of second bit field indication information and match values.

The switch may match a bit field determined by the first group of second bit field indication information in the match field and corresponding to IP DA, and match a bit field determined by the second group of second bit field indication information in the match field and corresponding to a UDP port number 2152. Namely, the switch may determine the bit field where the IP DA in the GTP-U data packet is located according to the first group of second bit field indication information in OXM indicating the IP DA, and compare to determine whether the value of the bit field is equal to the first group of match values in the OXM. Meanwhile, the switch may determine the bit field where a UDP port in the GTP-U data packet is located according to the second group of second bit field indication information in the OXM indicating the UDP port, and compare to determine whether the value of the bit field is equal to the second group of match values in the OXM. If the two bit fields are both matched successfully, the switching device may perform a GTP decapsulation according to operation field information in the flow entry.

The controller may determine that the GTP decapsulation needs to be performed on the data packet by means of the foregoing GTP-C session creation operation or parse of the first GTP-U data packet.

The switch has created the flow entry according to the foregoing flow entry addition indication message sent by the controller. The operation field information in the flow entry may include multiple groups of operation types corresponding to decapsulation processing and first bit field indication information corresponding to the operation types, wherein a GTP encapsulation header may include an outer layer IP header, a UDP header and a GTP header. The decapsulation processing may include the following several groups of operation types and the first bit field indication information corresponding to the operation types:

(1) checksums of the outer layer IP header and the UDP header are respectively verified according to double Verify-Checksum operation types and the corresponding first bit field indication information, namely, double Verify-Checksum (Top-offset1, Size1/Bottom-offset1, Top-offset2, Size2).

(2) An IP-UDP-GTP header is popped according to a pop operation type and the corresponding first bit field indication information, namely, Pop (Top-offset, Size), in order to decapsulate the IP data packet.

(3) operation of minus 1 is performed on a bit field corresponding to TTL in the IP data packet according to a decrement operation type and the corresponding first bit field indication information, namely, Decrement (Top-offset, Size, Mask, Step).

(4) A checksum of an inner layer IP header is updated according to a Calculate-Checksum operation type and the corresponding first bit field indication information, namely, Calculate-Checksum (Top-offset1, Bottom-offset1, Top-offset2, Size2).

In the embodiment of the present disclosure, the flow entry is generated according to the match field information and the operation field information sent by the controller, so that the switch may directly perform tunnel decapsulation processing on the GTP-U data packet according to the first bit field indication information and the second bit field indication information without parsing the protocol format of the data packet, and flexible user-definable flow operation may be achieved.

Figure 10:
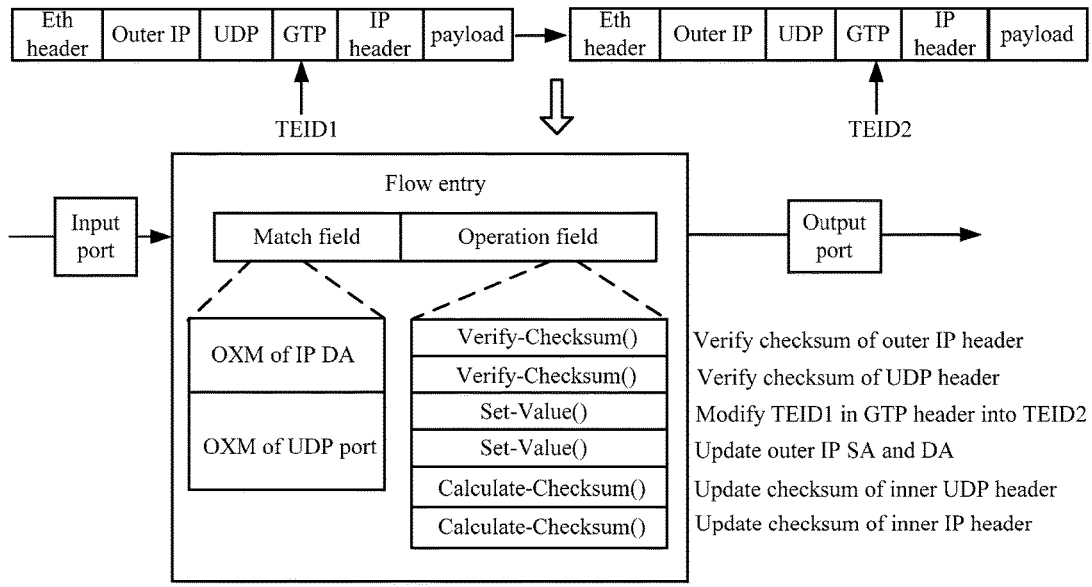
FIG. 10 is a schematic diagram of another example of a process of a data packet processing method according to an embodiment of the present disclosure.

FIG. 10 is a schematic diagram of another example of a process of a data packet processing method according to an embodiment of the present disclosure. In the embodiment, a switching device is a switch, and a control device is a controller.

In FIG. 10, with a GTP protocol as an example, after the switch creates a flow entry and when the switch receives a GTP-U data packet, how to perform GTP tunnel decapsulation and re-encapsulation processing according to the flow entry is described. In the processing process, there is no need to pop the original tunnel packet header firstly and then push a new tunnel packet header, while only an outer layer IP address, tunnel ID and other information need to be modified.

In the embodiment, a match field of the flow entry includes two groups of second bit field indication information and match values.

The switch may match a bit field determined by the first group of second bit field indication information in the match field and corresponding to IP DA, and match a bit field determined by the second group of second bit field indication information in the match field and corresponding to a UDP port number 2152. Namely, the switch may determine the bit field where the IP DA in the GTP-U data packet is located according to the first group of second bit field indication information in OXM indicating the IP DA, and compare to determine whether the value of the bit field is equal to the first group of match values in the OXM. Meanwhile, the switching device may determine the bit field where a UDP port in the GTP-U data packet is located according to the second group of second bit field indication information in the OXM indicating the UDP port, and compare to determine whether the value of the bit field is equal to the second group of match values in the OXM. If the two bit fields are both matched successfully, the switching device may modify tunnel header field information according to operation field information in the flow entry.

The controller may determine that GTP decapsulation and re-encapsulation needs to be performed on the data packet by means of the foregoing GTP-C session creation operation or parse of the first GTP-U data packet.

The switch has created the flow entry according to the foregoing flow entry addition indication message sent by the controller. The operation field information in the flow entry may include multiple groups of operation types corresponding to the decapsulation and re-encapsulation processing and first bit field indication information corresponding to the operation types. A GTP encapsulated header may include an outer layer IP header, a UDP header and a GTP header. The decapsulation and re-encapsulation processing may include the following several groups of operation types and the first bit field indication information corresponding to the operation types:

(1) checksums of the outer layer IP header and the UDP header are respectively verified according to double Verify-Checksum operation types and the corresponding first bit field indication information, namely, double Verify-Checksum (Top-offset1, Size1/Bottom-offset1, Top-offset2, Size2).

(2) The original TEID1 in the GTP header is modified to new TEID2 according to a Set-value operation type and the corresponding first bit field indication information, namely, Set-value (Top-offset, Size, Mask, Data).

(3) A source address and a destination address in the outer layer IP header are updated according to the Set-value operation type and the corresponding first bit field indication information, namely, Set-value (Top-offset, Size, Mask, Data).

(4) The checksum of an inner layer UDP header and the checksum of the inner layer IP header are respectively updated according to double Calculate-Checksum operation types and the corresponding first bit field indication information, namely, double Calculate-Checksum (Top-offset1, Size1/Bottom-offset1, Top-offset2, Size2).

In the embodiment of the present disclosure, the flow entry is generated according to the match field information and the operation field information sent by the controller, so that the switch may directly perform tunnel decapsulation and re-encapsulation processing on the GTP-U data packet according to the first bit field indication information and the second bit field indication information without parsing the protocol format of the data packet, and flexible user-definable flow operation may be achieved.

In the embodiment of the present disclosure, the above-mentioned flow entry may be extension of an existing flow entry, for example, the above-mentioned operation field information and/or match field information may be added in the flow entry of an existing common flow table. The above-mentioned flow entry may also be independently stored in a flow table newly added in the switch. The arrangement of the flow table in the embodiment of the present disclosure will be described below in detail in combination with specific examples.

Figure 11:
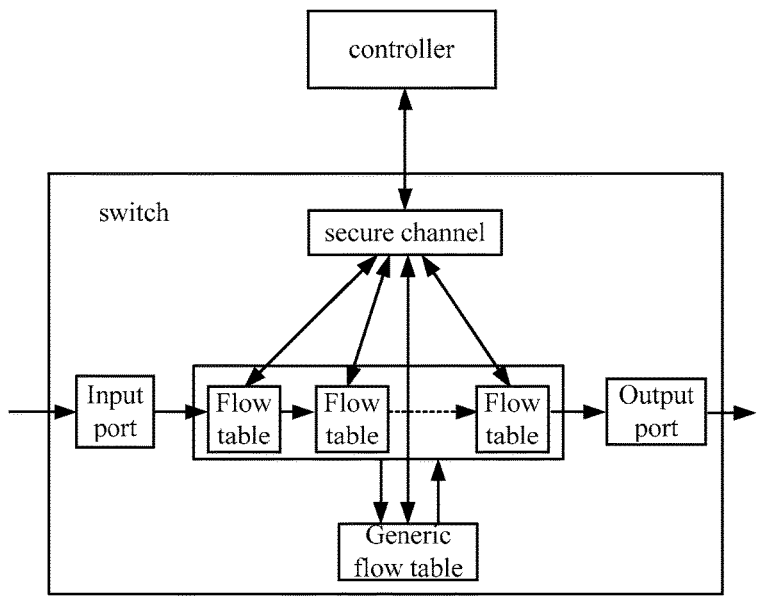
FIG. 11 is a schematic diagram of an example of an arrangement of a flow table according to an embodiment of the present disclosure.

FIG. 11 is a schematic diagram of an example of an arrangement of a flow table according to an embodiment of the present disclosure.

As shown in FIG. 11, a flow entry in the embodiment of the present disclosure may be independently stored in a newly added flow table, and in order to differ from other existing common flow tables (the flow table as shown in FIG. 1), and the newly added flow table may be called as a generic flow table. The other common flow tables may be kept unchanged. The generic flow table may be inserted in an existing flow pipeline, the other common flow tables in the flow pipeline may jump to the generic flow table, and the generic flow table may also jump back to the other common flow tables in the flow pipeline.

The flow entry of the generic flow table adopts the same structure as the flow entry in the common flow table, but may include OXM in the embodiment of the present disclosure in match field information, and may include an operation type and corresponding first bit field indication information in the embodiment of the present disclosure in operation field information.

Therefore, in the embodiment of the present disclosure, by adding the generic flow table to store the flow entry including the match field information and the operation field information without extending the flow entry in the original common flow table, the processing is more convenient.

Figure 12:
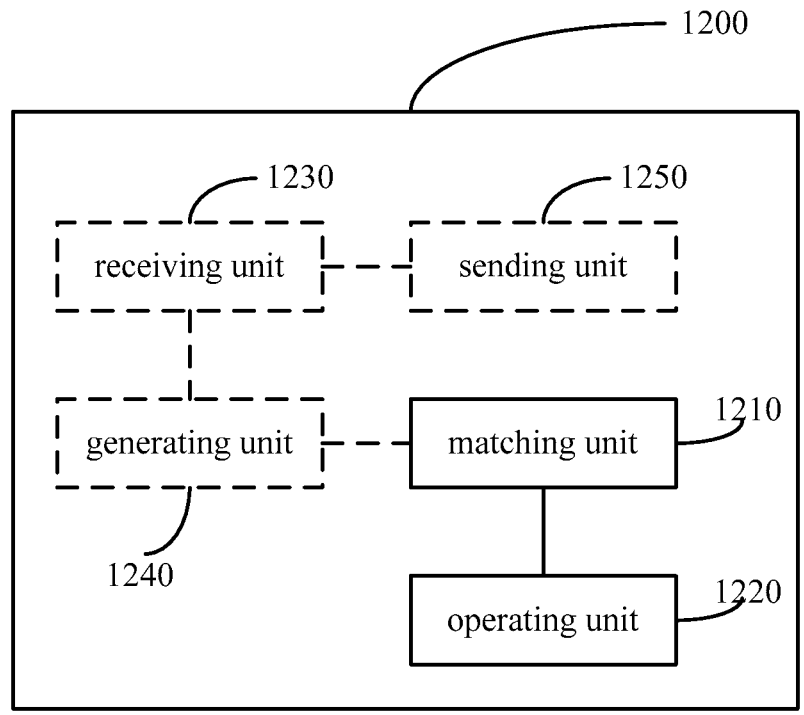
FIG. 12 is a schematic block diagram of a data packet processing apparatus according to an embodiment of the present disclosure.

FIG. 12 is a schematic block diagram of a data packet processing apparatus according to an embodiment of the present disclosure. An example of the apparatus 1200 as shown in FIG. 12 is switching device, for example, an OpenFlow switch. The apparatus 1200 includes a matching unit 1210 and an operating unit 1220.

The matching unit 1210 is configured to match a data packet with match field information of a flow entry; the flow entry includes the match field information and operation field information; wherein the operation field information includes an operation type and first bit field indication information, the first bit field indication information includes a first offset and a first field length, and the first bit field indication information is used for indicating the first bit field of the data packet, or the match field information includes second bit field indication information and a match value, the second bit field indication information includes a second offset and a second field length, and the second bit field indication information is used for indicating the second bit field of the data packet.

The operating unit 1220 is configured to, if the data packet is successfully matched with the match field information, perform operation on the data packet according to the operation field information.

Optionally, when the operation field information includes the operation type and the first bit field indication information, the operating unit 1220 is specifically configured to, if the data packet is successfully matched with the match field information, determine the first bit field of the data packet according to the first bit field indication information, and perform the operation on the first bit field according to the operation type.

Optionally, when the operation field information includes the operation type and the first bit field indication information, the first bit field indication information further includes a first mask, correspondingly, the operating unit 1220 is specifically configured to, if the data packet is successfully matched with the match field information, determine the first bit field of the data packet according to the first bit field indication information, acquire at least one bit of the first bit field according to the first mask, and perform the operation on the at least one bit of the first bit field according to the operation type.

Optionally, when the operation field information includes the operation type and the first bit field indication information, and if the operation field information further includes an operand, the operating unit 1220 is specifically configured to, if the data packet is successfully matched with the match field information, determine the first bit field of the data packet according to the first bit field indication information, and perform the operation on the first bit field and the operand according to the operation type.

Optionally, when the match field information includes the second bit field indication information and the match value, the matching unit 1210 is specifically configured to determine the second bit field of the data packet according to the second bit field indication information, and match the second bit field according to the match value.

Optionally, when the match field information includes the second bit field indication information and the match value, and if the second bit field indication information further includes a second mask, the matching unit 1210 is specifically configured to determine the second bit field of the data packet according to the second bit field indication information, acquire at least one bit of the second bit field according to the second mask, and match the at least one bit of the second bit field according to the match value.

Exemplarily, the operation type includes a pop operation type, a push operation type, a Set-value operation type, a Calculate-Length operation type, a Calculate-Checksum operation type, a Verify-Checksum operation type, an increment operation type, a decrement operation type or a copy operation type.

Other functions and operations of the apparatus 1200 may refer to processes involving the switching devices in the method embodiments from FIG. 2 to FIG. 11, and will not be repeated redundantly herein, in order to avoid repetition.

In the embodiment of the present disclosure, by determining the first bit field of the data packet according to the first bit field indication information including the first offset and the first field length in the operation field information, and performing the operation on the first bit field according to the operation type in the operation field information, the operation of the data packet is not limited to a particular protocol format any more. Similarly, the switching device may arbitrarily determine the second bit field in the data packet according to the second bit field indication information and match the second bit field without parsing the specific protocol format of the data packet. Therefore, by adopting the apparatus as shown in FIG. 12, standardized extension of a newly added protocol may be avoided, thus flexible user-definable flow operation can be achieved.

As another embodiment of the present disclosure, the apparatus 1200 may further includes a receiving unit 1230 and a generating unit 1240. The receiving unit 1230 is configured to receive a flow entry addition indication message sent by control device, wherein the flow entry addition indication message includes the match field information and the operation field information; and the generating unit is configured to generate the flow entry according to the match field information and the operation field information.

Optionally, the receiving unit 1230 is further configured to receive a flow entry modification indication message sent by the control device, wherein the flow entry modification indication message includes the match field information and new operation field information; correspondingly, the apparatus 1200 further includes a modifying unit 1240, configured to modify the flow entry according to the match field information and the new operation field information.

Optionally, the receiving unit 1230 is further configured to receive a feature request message sent by the control device, wherein the feature request message is used for inquiring whether the operation field information or the match field information is supported; and correspondingly, the apparatus 1200 further includes a sending unit 1250, configured to send a feature response message to the control device, wherein the feature response message is used for indicating that the operation field information or the match field information is supported.

Optionally, the apparatus 1200 may be a switching device. Exemplarily, the switching device may be a switch.

Other functions and operations of the apparatus 1200 may refer to processes involving the switching devices in the method embodiments from FIG. 2 to FIG. 11, and will not be repeated redundantly herein, in order to avoid repetition.

In the embodiment of the present disclosure, by adopting the offset and the field length, flexible positioning of a particular bit field in the data packet can be achieved, and flexible custom processing of the data packet can be achieved, such that the processing of the data packet is not limited to a particular protocol format any more, standardized extension of a newly added protocol is avoided, and the processing of the data packet is more universal.

Figure 13:
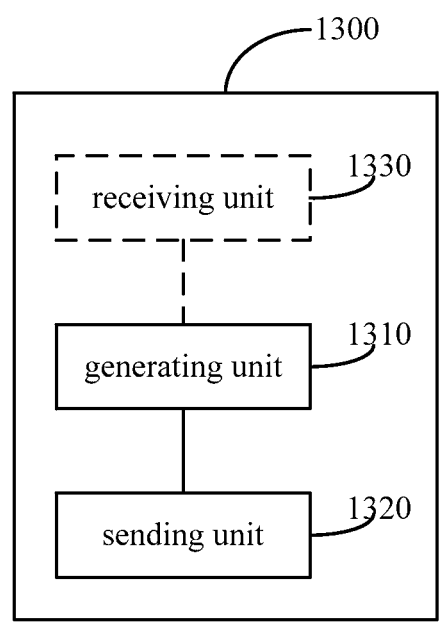
FIG. 13 is a schematic block diagram of a data packet processing apparatus according to another embodiment of the present disclosure.

FIG. 13 is a schematic block diagram of a data packet processing apparatus according to another embodiment of the present disclosure. As shown in FIG. 13, the apparatus 1300 includes a generating unit 1310 and a sending unit 1320.

The generating unit 1310 is configured to generate a flow entry addition indication message, and the flow entry addition indication message includes match field information and operation field information, wherein the operation field information includes an operation type and first bit field indication information, the first bit field indication information includes a first offset and a first field length, and the first bit field indication information is used for indicating the first bit field of the data packet, or the match field information includes second bit field indication information and a match value, the second bit field indication information includes a second offset and a second field length, and the second bit field indication information is used for indicating the second bit field of the data packet.

The sending unit 1320 is configured to send the flow entry addition indication message to switching device, for enabling the switching device to generate a flow entry according to the flow entry addition indication message and process the data packet according to the flow entry.

Optionally, the generating unit 1310 is further configured to generate a flow entry modification indication message, wherein the flow entry modification indication message includes the match field information and new operation field information; and correspondingly, the sending unit 1320 is further configured to send the flow entry modification indication message to the switching device, for enabling the switching device to modify the flow entry corresponding to the match field information according to the match field information and the new operation field information.

Optionally, the sending unit 1320 is further configured to send a feature request message to the switching device, wherein the feature request message is used for inquiring whether the match field information or the operation field information is supported; and correspondingly, the apparatus 1300 further includes a receiving unit 1330, configured to receive a feature response message sent by the switching device, wherein the feature response message is used for indicating that the match field information or the operation field information is supported.

Optionally, the apparatus 1300 may be a control device, and exemplarily, may be a controller.

The working manner of the apparatus 1300 in the embodiment may refer to the working manner of the control devices as shown in FIG. 3 to FIG. 11, and will not be repeated redundantly herein.

The apparatus in the embodiment of the present disclosure, by sending the bit field indication information carrying the offset and the field length to the switching device, may achieve flexible positioning of a particular bit field in the data packet and achieve flexible custom processing of the data packet, such that the processing of the data packet is not limited to a particular protocol format any more, standardized extension of a newly added protocol is avoided, and the processing of the data packet is more universal.

Figure 14:
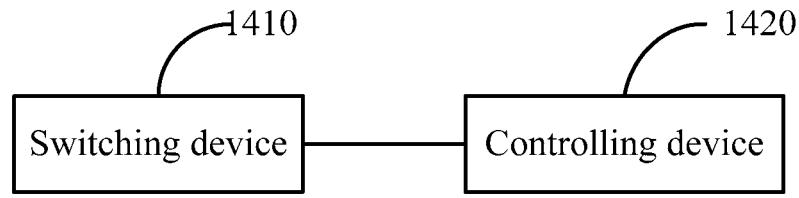
FIG. 14 is a schematic block diagram of a data packet processing system according to another embodiment of the present disclosure.

Another embodiment of the present disclosure further provides a data packet processing system, as shown in FIG. 14, the system includes switching device 1410 and control device 1420.

Exemplarily, the switching device 1410 may be the apparatus as shown in FIG. 12, and the control device may be the apparatus as shown in FIG. 13.

The working manner of the system may refer to the working manners in the embodiments as shown in FIG. 2 to FIG. 11, and will not be repeated redundantly herein.

In the embodiment of the present disclosure, a particular bit field of a data packet may be flexibly determined according to offset and a field length, and the particular bit field is matched or operated, thus flexible custom processing of the data packet may be achieved, such that the processing of the data packet is not limited to a particular protocol format any more, standardized extension of a newly added protocol is avoided, and the processing of the data packet is more universal.

Another embodiment of the present disclosure further provides a flow entry, including match field information and operation field information. The operation field information includes an operation type and first bit field indication information, the first bit field indication information includes a first offset and a first field length, and the first bit field indication information is used for indicating the first bit field of the data packet, or the match field information includes second bit field indication information and a match value, the second bit field indication information includes a second offset and a second field length, and the second bit field indication information is used for indicating the second bit field of the data packet.

Optionally, the first bit field indication information further includes a first mask.

Optionally, the second bit field indication information further includes a second mask.

Optionally, the operation field information further includes an operand.

Optionally, the operation type includes a pop operation type, a push operation type, a Set-value operation type, a Calculate-Length operation type, a Calculate-Checksum operation type, a Verify-Checksum operation type, an increment operation type, a decrement operation type or a copy operation type.

By adopting the flow entry provided by the embedment of the present disclosure, a particular bit field of a data packet may be flexibly determined, and the particular bit field is matched or operated, thus flexible custom processing of the data packet can be achieved, such that the processing of the data packet is not limited to a particular protocol format any more, standardized extension of a newly added protocol is avoided, and the processing of the data packet is more universal.

Another embodiment of the present disclosure further provides a computer program product for processing a data packet. The computer program product includes a computer-executable program code, and the program code is used for implementing the data packet processing method as shown in FIG. 2.

Figure 15:
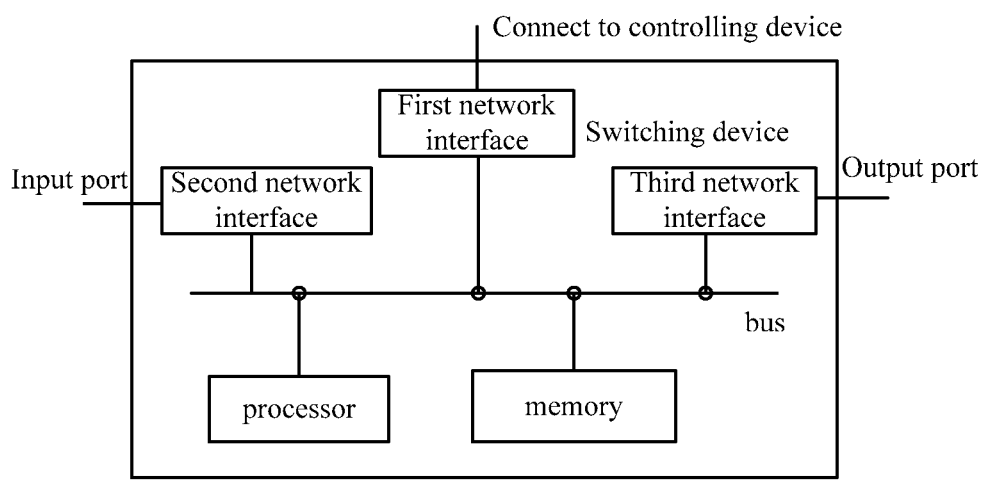
FIG. 15 is a schematic diagram of a structure of a hardware implementation of a data packet processing apparatus according to another embodiment of the present disclosure.

As shown in FIG. 15, the embodiment of the present disclosure provides a hardware implementation of a data packet processing apparatus. The apparatus may be switching device, and exemplarily, may be a switch supporting an OpenFlow technology.

The apparatus includes a processor, a memory, a first network interface, a second network interface and a third network interface. The first network interface, the second network interface, the third network interface, the processor and the memory are interconnected through a bus. The first network interface may be connected with a control device for interaction, and exemplarily, the control device may be a controller supporting the OpenFlow technology. The second network interface is used as the input port of the apparatus and may be used for receiving a data packet. The third network interface is used as the output port of the apparatus and may be used for sending a data packet processed by the processor. Exemplarily, each network interface may include a plurality of input and output ports. The first, second and third network interfaces may be mutually independent network interfaces, and may also be mutually combined into one network interface. The memory may be a semiconductor storage unit and may be directly accessed by the processor.

The memory is used for storing computer-executable program codes, and the program codes are used for implementing the data packet processing method as shown in FIG. 2 and storing the flow entry provided by the embodiment of the present disclosure. The processor is used for implementing the data packet processing method as shown in FIG. 2 according to the computer-executable program codes stored in the memory and processing the received data packet.

Exemplarily, by adopting the first network interface, a flow entry addition indication message sent by the control device may be received, the flow entry addition indication message may include match field information and operation field information of the flow entry provided by the embodiment of the present disclosure, and the processor may generate the flow entry provided by the embodiment of the present disclosure according to the match field information and the operation field information carried in the flow entry addition indication message, and store the flow entry in the memory.

Exemplarily, by adopting the first network interface, a flow entry modification indication message sent by the control device may also be received, similar to the flow entry addition indication message, the flow entry modification indication message may include the match field information and the operation field information of the flow entry provided by the embodiment of the present disclosure, and the processor may find the corresponding flow entry in the memory according to the match field information and update the operation field information in the flow entry into the operation field information carried in the flow entry modification indication message.

Exemplarily, by adopting the first network interface, a feature request message sent by the control device may also be received, and the feature request message may be used for inquiring whether the switching device supports generic flow processing capacity, namely, whether the match field information or the operation field information of the flow entry provided by the embodiment of the present disclosure is supported. Correspondingly, by adopting the first network interface, a feature response message may be sent to the control device, and the feature response message may be used for indicating that the generic flow processing capacity is supported, namely, the match field information or the operation field information of the flow entry provided by the embodiment of the present disclosure is supported.

By virtue of the hardware implementation of the data packet processing apparatus provided by the embodiment, flexible positioning of a particular bit field of the data packet is achieved by adopting offset and a field length, thus flexible custom processing of the data packet can be achieved, such that the processing of the data packet is not limited to a particular protocol format any more, standardized extension of a newly added protocol is avoided, and the processing of the data packet is more universal.

Figure 16:
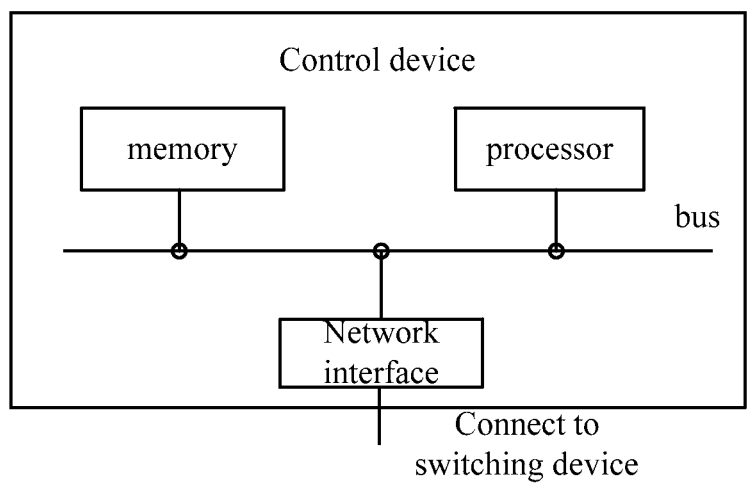
FIG. 16 is a schematic diagram of a structure of a hardware implementation of a data packet processing apparatus according to another embodiment of the present disclosure.

As shown in FIG. 16, the embodiment of the present disclosure provides a hardware implementation of a data packet processing apparatus. The apparatus may be a control device, and exemplarily, may be a controller supporting an OpenFlow technology.

The apparatus includes a memory, a processor and a controller. The memory, the processor and the controller are mutually communicated through a bus. A network interface may be connected to a switching device for interacting with the switching device. The memory may be a semiconductor device and may be directly accessed by the processor.

The memory is used for storing computer-executable program codes, and the program codes are used for implementing the data packet processing method as shown in FIG. 3. The processor is used for implementing the data packet processing method as shown in FIG. 3 according to the computer-executable program code stored in the memory. A flow entry addition indication message, a flow entry modification indication message or a feature request message is sent by the processor to the switching device through the network interface.

By sending the match field information and the operation field information including the flow entry provided by the embodiment of the present disclosure to the switching device, the switching device may generate the flow entry provided by the embodiment of the present disclosure, thus flexible positioning of a particular bit field of a data packet is achieved, and then flexible custom processing of the data packet can be achieved, standardized extension of a newly added protocol is avoided, and the processing of the data packet is more universal.

Those of ordinary skill in the art may be aware that, units and algorithm steps of the examples described in the embodiments disclosed in this description may be implemented by electronic hardware or a combination of computer software and the electronic hardware. Whether these functions are implemented in the form of hardware or software depends on specific applications and design constraint conditions of the technical solutions. Those skilled may implement the described functions using different methods for each specific application, but this implementation should not be considered beyond the scope of the present disclosure.

Those skilled in the art to which the present disclosure pertains may clearly understand that, for convenience and simplicity of description, the specific working processes of the system, apparatus and units described above may refer to corresponding processes in the foregoing method embodiments, and will not be repeated redundantly herein.

In the several embodiments provided in the present application, it should be understood that, the disclosed system, apparatus and method may be implemented in other manners. For example, the apparatus embodiments described above are merely exemplary, e.g., the division of the units is only a logic function division, other division manners may exist in practical implementation, for example, a plurality of units or components may be combined or integrated to another system, or some features may be omitted or not implemented. From another point of view, the displayed or discussed mutual coupling or direct coupling or communication connection may be indirect coupling or communication connection of devices or units through some interfaces, and may be in electrical, mechanical or other forms.

The units described as separate components may be separated physically or not, components displayed as units may be physical units or not, namely, may be located in one place, or may be distributed on a plurality of network units. A part of or all of the units may be selected to achieve the purposes of the solutions in the embodiments according to actual demand.

In addition, the functional units in the embodiments of the present disclosure may be integrated in a processing unit, or the units singly exist physically, or two or more units are integrated in one unit.

If the function is implemented in the form of a software functional unit and is sold or used as an independent product, it may be stored in a computer readable storage medium. Based on this understanding, the technical solutions of the present disclosure substantially, or the part contributing to the related art, or a part of the technical solutions may be implemented in the form of a software product, the computer software product is stored in a storage medium, and includes a plurality of instructions enabling computer device (may be a personnel computer, a server, or network device, etc.) to execute all or a part of the steps of the methods in the embodiments of the present disclosure. The foregoing storage medium includes a variety of media capable of storing program codes, such as a USB disk, a mobile hard disk, a read-only memory (ROM), a random access memory (RAM), a magnetic disk, an optical disk or the like.

The foregoing descriptions are merely specific implementations of the present disclosure, rather than limiting the protection scope of the present disclosure. Any skilled one who is familiar with this art could readily think of variations or substitutions within the disclosed technical scope of the present disclosure, and these variations or substitutions shall fall within the protection scope of the present disclosure. Accordingly, the protection scope of the claims should be defined by the protection scope of the present disclosure.

What is claimed is:

1. A method for processing a data packet, comprising:
   receiving, by a switching device, a flow entry addition indication message sent by a control device, wherein the flow entry addition indication message comprises a match field information and a operation field information;

generating, by the switching device, a flow entry according to the match field information and the operation field information;

matching, by the switching device, a data packet with the match field information of the flow entry, the flow entry comprising the match field information and the operation field information; wherein the operation field information comprises an operation type and first bit field indication information, the first bit field indication information comprises a first offset and a first field length, and the first bit field indication information indicates a first bit field of the data packet, or the match field information comprises second bit field indication information and a match value, the second bit field indication information comprises a second offset and a second field length, and the second bit field indication information indicates a second bit field of the data packet; and performing, by the switching device, if the data packet is successfully matched with the match field information, an operation, corresponding to the operation type in the operation field information, on the data packet according to the operation field information;

wherein the operation type comprises a pop operation type, a push operation type, a Set-value operation type, a Calculate-Length operation type, a Calculate-Checksum operation type, a Verify-Checksum operation type, an increment operation type, a decrement operation type or a copy operation type.

2. The method of claim 1, wherein when the operation field information comprises the operation type and the first bit field indication information, the performing, by the switching device, the operation, corresponding to the operation type in the operation field information, on the data packet according to the operation field information, comprises:

determining, by the switching device, the first bit field of the data packet according to the first bit field indication information; and performing, by the switching device, the operation on the first bit field according to the operation type.

3. The method of claim 1, wherein when the operation field information comprises the operation type and the first bit field indication information, the first bit field indication information further comprises a first mask, and the performing, by the switching device, the operation, corresponding to the operation type in the operation field information, on the data packet according to the operation field information, comprises:

determining, by the switching device, the first bit field of the data packet according to the first bit field indication information;

acquiring, by the switching device, at least one bit of the first bit field according to the first mask; and performing, by the switching device, the operation on the at least one bit of the first bit field according to the operation type.

4. The method of claim 1, wherein when the match field information comprises the second bit field indication information and the match value, the matching the data packet with the match field information of the flow entry comprises:

determining, by the switching device, the second bit field of the data packet according to the second bit field indication information; and matching, by the switching device, the second bit field according to the match value.

5. The method of claim 1, wherein when the match field information comprises the second bit field indication information and the match value, the second bit field indication information further comprises a second mask, and the matching the data packet with the match field information of the flow entry comprises:

determining, by the switching device, the second bit field of the data packet according to the second bit field indication information;

acquiring, by the switching device, at least one bit of the second bit field according to the second mask; and matching, by the switching device, the at least one bit of the second bit field according to the match value.

6. The method of claim 1, further comprising:

receiving, by the switching device, a flow entry modification indication message sent by a control device, wherein the flow entry modification indication message comprises the match field information and new operation field information; and modifying, by the switching device, the flow entry according to the match field information and the new operation field information.

7. The method of claim 1, further comprising:

receiving, by the switching device, a feature request message sent by a control device, wherein the feature request message is used for inquiring whether the operation field information or the match field information is supported; and sending, by the switching device, a feature response message to the control device, wherein the feature response message indicates that the operation field information or the match field information is supported.

8. Apparatus for processing a data packet, comprising:

a network interface configured to receive a flow entry addition indication message sent by a control device, wherein the flow entry addition indication message comprises a match field information and a operation field information;

a processor, configured to generate a flow entry according to the match field information and the operation field information;

the processor is further configured to match a data packet with the match field information of the flow entry; the flow entry comprising the match field information and the operation field information; wherein the operation field information comprises an operation type and first bit field indication information, the first bit field indication information comprises a first offset and a first field length, and the first bit field indication information indicates a first bit field of the data packet, or the match field information comprises second bit field indication information and a match value, the second bit field indication information comprises a second offset and a second field length, and the second bit field indication information indicates a second bit field of the data packet; and the processor is further configured to perform, if the data packet is successfully matched with the match field information, an operation, corresponding to the operation type in the operation field information, on the data packet according to the operation field information;

wherein the operation type comprises a pop operation type, a push operation type, a Set-value operation type, a Calculate-Length operation type, a Calculate-Checksum operation type, a Verify-Checksum operation type, an increment operation type, a decrement operation type or a copy operation type.

9. The apparatus of claim 8, wherein when the operation field information comprises the operation type and the first bit field indication information, the processor is configured to, if the data packet is successfully matched with the match field information, determine the first bit field of the data packet according to the first bit field indication information, and perform the operation on the first bit field according to the operation type.

10. The apparatus of claim 8, wherein when the operation field information comprises the operation type and the first bit field indication information, the first bit field indication information further comprises a first mask, and the processor is configured to, if the data packet is successfully matched with the match field information, determine the first bit field of the data packet according to the first bit field indication information, acquire at least one bit of the first bit field according to the first mask, and perform the operation on the at least one bit of the first bit field according to the operation type.

11. The apparatus of claim 10, wherein when the operation field information further comprises an operand, and the processor is configured to, if the data packet is successfully matched with the match field information, determine the first bit field of the data packet according to the first bit field indication information, and perform the operation on the first bit field and the operand according to the operation type.

12. The apparatus of claim 8, wherein when the match field information comprises the second bit field indication information and the match value, the processor is configured to determine the second bit field of the data packet according to the second bit field indication information, and match the second bit field according to the match value.

13. The apparatus of claim 8, wherein when the match field information comprises the second bit field indication information and the match value, the second bit field indication information further comprises a second mask, the processor is configured to determine the second bit field of the data packet according to the second bit field indication information, acquire at least one bit of the second bit field according to the second mask, and match the at least one bit of the second bit field according to the match value.

14. The apparatus of claim 13, wherein
the network interface is further configured to receive a feature request message sent by a control device, wherein the feature request message queries whether the operation field information or the match field information is supported; and
the network interface is further configured to send a feature response message to the control device, wherein the feature response message indicates that the operation field information or the match field information is supported.

15. Apparatus for processing a data packet, comprising:
a processor configured to generate a flow entry addition indication message, the flow entry addition indication message comprising match field information and operation field information; wherein the operation field information comprises an operation type and first bit field indication information, the first bit field indication information comprises a first offset and a first field length, and the first bit field indication information indicates a first bit field of the data packet, or the match field information comprises second bit field indication information and a match value, the second bit field indication information comprises a second offset and a second field length, and the second bit field indication information indicates a second bit field of the data packet; and
a network interface, configured to send the flow entry addition indication message to a switching device, to enable the switching device to generate a flow entry according to the flow entry addition indication message and process the data packet according to the flow entry.

16. The apparatus of claim 15, wherein
the processor is further configured to generate a flow entry modification indication message, wherein the flow entry modification indication message comprises the match field information and new operation field information; and
the network interface is further configured to send the flow entry modification indication message to the switching device, to enable the switching device to modify the flow entry corresponding to the match field information according to the match field information and the new operation field information.

17. The apparatus of claim 15, wherein
the network interface is further configured to send a feature request message to the switching device, wherein the feature request message queries whether the match field information or the operation field information is supported; and
the network interface is further configured to receive a feature response message sent by the switching device, wherein the feature response message indicates that the match field information or the operation field information is supported.

* * * * *